United States Patent
Piech et al.

(10) Patent No.: US 12,304,005 B2
(45) Date of Patent: May 20, 2025

(54) SACRIFICIAL LAYERS TO ENABLE LASER CUTTING OF TEXTURED SUBSTRATES

(71) Applicant: CORNING INCORPORATED, Corning, NY (US)

(72) Inventors: Garrett Andrew Piech, Corning, NY (US); Sergio Tsuda, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/587,430

(22) Filed: Jan. 28, 2022

(65) Prior Publication Data

US 2022/0241902 A1  Aug. 4, 2022

Related U.S. Application Data

(60) Provisional application No. 63/144,165, filed on Feb. 1, 2021.

(51) Int. Cl.
| | |
|---|---|
| *B23K 26/40* | (2014.01) |
| *B23K 26/04* | (2014.01) |
| *B23K 103/00* | (2006.01) |

(52) U.S. Cl.
CPC .............. *B23K 26/40* (2013.01); *B23K 26/04* (2013.01); *B23K 2103/54* (2018.08)

(58) Field of Classification Search
None
See application file for complete search history.

(56) References Cited

U.S. PATENT DOCUMENTS

| | | | |
|---|---|---|---|
| 6,211,488 B1 * | 4/2001 | Hoekstra | B23K 26/53 |
| | | | 219/121.72 |
| 9,758,876 B2 | 9/2017 | Shorey et al. | |

(Continued)

FOREIGN PATENT DOCUMENTS

| | | |
|---|---|---|
| NL | 2017998 | 6/2018 |
| WO | 2014/079570 A1 | 5/2014 |

(Continued)

OTHER PUBLICATIONS

International Search Report and Written Opinion of the International Searching Authority; PCT/US2022/014567; mailed on May 12, 2022, 14 pages; European Patent Office.

(Continued)

*Primary Examiner* — Elizabeth M Kerr
(74) *Attorney, Agent, or Firm* — John P. McGroarty

(57) ABSTRACT

A method of separating a transparent workpiece comprises depositing a sacrificial layer onto a textured surface of the transparent workpiece, the sacrificial layer comprising a refractive index that is less than or equal to a refractive index of the transparent workpiece and greater than or equal to a refractive index of air. A defect-forming laser beam is generated via an optical assembly and used to form a plurality of defects in the transparent workpiece through sacrificial layer. The defect forming laser beam either comprises a pulsed laser beam forming a laser beam focal line in the transparent workpiece or an optical power of greater than or equal a critical power level to induce Kerr effect self-focusing in the transparent workpiece. The transparent workpiece is separated along the contour.

17 Claims, 15 Drawing Sheets

(56) References Cited

U.S. PATENT DOCUMENTS

| | | |
|---|---|---|
| 10,435,796 B2 | 10/2019 | Domey et al. |
| 10,730,783 B2 | 8/2020 | Akarapu et al. |
| 2014/0147623 A1* | 5/2014 | Shorey ................... C23F 4/04 |
| | | 428/137 |
| 2014/0199519 A1 | 7/2014 | Schillinger et al. |
| 2015/0118522 A1* | 4/2015 | Hosseini ............. C03B 33/0222 |
| | | 428/64.2 |
| 2015/0165548 A1* | 6/2015 | Marjanovic ........... C03B 33/091 |
| | | 219/121.73 |
| 2015/0165563 A1 | 6/2015 | Manley et al. |
| 2015/0166393 A1 | 6/2015 | Marjanovic et al. |
| 2019/0300418 A1* | 10/2019 | Rosier .................. B23K 26/009 |
| 2020/0061750 A1 | 2/2020 | Eppelt et al. |
| 2022/0064062 A1 | 3/2022 | Bankaitis et al. |

FOREIGN PATENT DOCUMENTS

| | | |
|---|---|---|
| WO | 2016/079275 A1 | 5/2016 |
| WO | 2016/089799 A1 | 6/2016 |
| WO | 2016/154284 A1 | 9/2016 |
| WO | 2017/055576 A1 | 4/2017 |
| WO | 2019/185279 A1 | 10/2019 |

OTHER PUBLICATIONS

"Slide describes ability cutting of glass with high roughness. Background presentation is about filamention based cutting of glass. No process details supplied, just "patent pending" on slide", See slide 16 (attached), Dec. 5, 2019, 43 pages.

* cited by examiner

SACRIFICIAL LAYERS TO ENABLE LASER CUTTING OF TEXTURED SUBSTRATES

This application claims the benefit of priority under 35 U.S.C. § 119 of U.S. Provisional Application Ser. No. 63/144,165 filed on Feb. 1, 2021 the content of which is relied upon and incorporated herein by reference in its entirety.

BACKGROUND

Field

The present specification generally relates to apparatuses and methods for laser processing transparent workpieces.

Technical Background

Advancements in precision micromachining and related process improvements made to reduce size, weight and material costs have facilitated fast pace growth of products such as, but not limited to, flat panel displays for touch screens, tablets, smartphones and televisions. As a result of these advancements, ultrafast pulsed industrial lasers have become important tools for applications requiring high precision micromachining. Laser cutting processes utilizing such lasers are expected to separate substrates in a controllable fashion, to form negligible debris and low subsurface damage to the substrate. Surface texture of a substrate can reduce the effectiveness of laser cutting processes. For example, surface texture may scatter or distort a laser beam, preventing the laser beam from possessing adequate energy density to modify the substrate through the substrate's entire thickness. Additionally, separation of the textured substrate may form unacceptable amounts of debris and also may cause subsurface damage to the separated portions of the substrate.

SUMMARY

A first aspect of the present disclosure includes method of separating a transparent workpiece, the method comprising: depositing a sacrificial layer onto a textured surface of the transparent workpiece, the transparent workpiece having a thickness between the textured surface and a second surface of the transparent workpiece, the sacrificial layer comprising a refractive index that is less than or equal to a refractive index of the transparent workpiece and greater than or equal to a refractive index of air, the textured surface having an Sa value of greater than or equal to 0.1 µm; generating a defect-forming laser beam via an optical assembly; forming a plurality of defects in the transparent workpiece by directing the defect-forming laser beam directly onto an impingement surface of the sacrificial layer from the optical assembly such that the laser beam propagates through the transparent substrate via the sacrificial layer and translating the transparent workpiece and the laser beam relative to each other along a contour line, wherein the defect forming laser beam comprises either: a pulsed laser beam forming a laser beam focal line in the transparent workpiece, or an optical power of greater than or equal a critical power level to induce Kerr effect self-focusing in the transparent workpiece; and separating the transparent workpiece along the contour.

A second aspect of the present disclosure comprises the first aspect, wherein the defect-forming laser beam comprises the optical power of greater than or equal to the critical power level to induce Kerr effect self-focusing throughout the entirety of the thickness.

A third aspect of the present disclosure comprises any of the first through the second aspects, wherein the defect-forming laser beam comprises the pulsed laser beam forming the laser beam focal line in the transparent workpiece, the laser beam focal line inducing absorption in the transparent workpiece, the induced absorption producing an individual defect of the plurality of defects in the transparent workpiece.

A fourth aspect of the present disclosure comprises any of the first through the third aspects, wherein the laser beam focal line formed from the pulsed laser beam comprises: a wavelength $\lambda$; a spot size $w_o$; and a Rayleigh range $Z_R$ that is greater than $$F_D \frac{\pi w_o^2}{\lambda},$$

where $F_D$ is a dimensionless divergence factor comprising a value of 10 or greater.

A fifth aspect of the present disclosure comprises any of the first through the fourth aspects, wherein the optical assembly includes a phase-altering optical element that generates a quasi-non-diffracting beam from the pulsed laser beam.

A sixth aspect of the present disclosure comprises any of the first through the fifth aspects, wherein phase-altering optical element comprises one of a refractive axicon, a diffractive axicon, or a spatial light modulator.

A seventh aspect of the present disclosure comprises any of the first through the sixth aspects, wherein the pulsed laser beam comprises pulse bursts comprising two or more subpulses per pulse burst, wherein each pulse burst comprises an energy of greater than or equal to 25 µJ and less than or equal to 5000 µJ.

An eighth aspect of the present disclosure comprises any of the first through the seventh aspects, wherein each of the plurality of defects comprise modified material of the transparent workpiece that is completely encapsulated within the transparent workpiece.

A ninth aspect of the present disclosure comprises any of the first through the eighth aspects, wherein at least a portion of the plurality of defects comprise ablated regions having diameters that are less than or equal to 5 µm.

A tenth aspect of the present disclosure comprises any of the first through the ninth aspects, wherein the plurality of defects comprise a defect length $D_l$, a maximal defect diameter $D_{dmax}$, and a defect aspect ratio comprising a ratio of $D_l$ to $D_{dmax}$, wherein the aspect ratio is greater than or equal to 15:1.

An eleventh aspect of the present disclosure comprises any of the first through the tenth aspects, wherein: the plurality of defects extend through a defect surface, the defect surface extending between the contour on the textured surface and end points of the plurality of defects at the second surface, and within the defect surface, the plurality of defects extend from the textured surface by a distance that greater than or equal to 80% of the thickness of the transparent workpiece along the defect surface.

A twelfth aspect of the present disclosure comprises any of the first through the eleventh aspects, wherein the separation results in a cut edge that deviates from the defect surface by less than or equal to 10 µm.

A thirteenth aspect of the present disclosure comprises any of the first through the twelfth aspects, wherein the textured surface has an Sa value of greater than or equal to 0.3 µm.

A fourteenth aspect of the present disclosure comprises any of the first through the thirteenth aspects, wherein the thickness is greater than or equal to 500 µm in a direction perpendicular to the textured surface and the second surface.

A fifteenth aspect of the present disclosure comprises any of the first through the fourteenth aspects, wherein the thickness is greater than or equal to 1 mm and less than or equal to 5 mm in a direction perpendicular to the textured surface and the second surface.

A sixteenth aspect of the present disclosure comprises any of the first through the fifteenth aspects, wherein the separating the transparent workpiece along the contour comprises directing an infrared laser beam onto the textured surface along the contour line and translating at least one of the transparent workpiece and the infrared laser beam relative to each other to apply thermal energy to the transparent workpiece along the contour line and induce crack propagation along the plurality of defects.

A seventeenth aspect of the present disclosure comprises any of the first through the sixteenth aspects, further comprising, prior to the separating the transparent workpiece along the contour, removing at least a portion of the sacrificial layer from the transparent workpiece to expose at least a portion of the plurality of defects at the textured surface.

An eighteenth aspect of the present disclosure comprises any of the first through the seventeenth aspects, wherein the removing the portion of the sacrificial layer from the transparent workpiece along the contour comprises directing the infrared laser beam in a sacrificial layer removal pass over the transparent workpiece along the contour to ablate the sacrificial layer covering the plurality of defects.

A nineteenth aspect of the present disclosure comprises any of the first through the eighteenth aspects, wherein the removing the portion of the sacrificial layer from the transparent workpiece along the contour comprises chemically removing the sacrificial layer from the transparent workpiece by application of a removal chemical to the sacrificial layer.

A twentieth aspect of the present disclosure comprises any of the first through the nineteenth aspects, wherein the separating the transparent workpiece along the contour results in a glass article having a cut edge conforming to the contour in an as-cut condition, wherein, over any given 100 µm length of the separated contour, a surface of the cut edge deviates from a fitted surface to the cut edge by less than or equal to 10 µm.

A twenty first aspect of the present disclosure comprises any of the first through the twentieth aspects, wherein the sacrificial layer comprises a polymer-based material.

A twenty second aspect of the present disclosure comprises any of the first through the twenty first aspects, wherein the polymer-based material comprises photoresist.

A twenty third aspect of the present disclosure comprises any of the first through the twenty second aspects, wherein the depositing the sacrificial layer onto the textured surface comprises: laminating the polymer-based material onto the textured surface; and curing the polymer-based material by exposing the laminated polymer-based material to a radiation source.

A twenty fourth aspect of the present disclosure comprises any of the first through the twenty third aspects, wherein the sacrificial layer has a thickness of greater than or equal to 10 µm and less than or equal to 20 µm.

A twenty fifth aspect of the present disclosure comprises any of the first through the twenty fourth aspects, wherein the impingement surface of the sacrificial layer has an Ra value that is less than or equal to 0.3 µm.

A twenty sixth aspect of the present disclosure comprises any of the first through the twenty sixth aspects, wherein the transparent workpiece comprises a rolled glass sheet.

A twenty seventh aspect of the present disclosure comprises any of the first through the twenty sixth aspects, wherein the transparent workpiece is constructed of a glass-ceramic material.

A twenty eighth aspect of the present disclosure comprises any of the first through the twenty seventh aspects, wherein the separating the transparent workpiece along the contour comprises applying an etching solution to the transparent workpiece to preferentially etch the transparent workpiece at the plurality of defects.

A twenty ninth aspect of the present disclosure comprises any of the first through the twenty eighth aspects, wherein the contour comprises a curve having a radius of curvature that is less than or equal to 10 mm.

A thirtieth aspect of the present disclosure comprises any of the first through the twenty ninth aspects, wherein the second surface comprises an Sa value of greater than or equal to 0.3 µm.

A thirty first aspect of the present disclosure comprises a method of separating a transparent workpiece, the method comprising: depositing a polymer-based sacrificial layer directly onto a textured surface of the transparent workpiece, the polymer-based sacrificial layer comprising a refractive index between that of the transparent workpiece and air; generating a defect-forming laser beam via an optical assembly; forming a plurality of defects in the transparent workpiece by directing the defect-forming laser beam directly onto an impingement surface of the polymer-based sacrificial layer from the optical assembly such that the laser beam propagates through the transparent substrate via the polymer-based sacrificial layer and translating the transparent workpiece and the laser beam relative to each other along a contour line, wherein the plurality of defects extend along a contour and extend from the textured surface into the transparent workpiece by a distance that greater than or equal to 80% of the thickness of the transparent workpiece; removing at least a portion of the polymer-based sacrificial layer from the transparent workpiece to expose at least a portion of the plurality of defects at the textured surface; and separating the transparent workpiece along the contour.

A thirty second aspect of the present disclosure includes the thirty first aspect, wherein the polymer-based sacrificial layer comprises photoresist.

A thirty third aspect of the present disclosure includes any of the thirty first through the thirty second aspects, wherein the depositing the polymer-based sacrificial layer onto the textured surface comprises: laminating the polymer-based material onto the textured surface; and curing the polymer-based material by exposing the laminated polymer-based material to a radiation source.

A thirty fourth aspect of the present disclosure includes any of the thirty first through the thirty third aspects, wherein the sacrificial layer has a thickness of greater than or equal to 10 µm and less than or equal to 20 µm.

A thirty fifth aspect of the present disclosure includes any of the thirty first through the thirty fourth aspects, wherein the transparent workpiece comprises a rolled glass sheet.

A thirty sixth aspect of the present disclosure includes any of the thirty first through the thirty fifth aspects, wherein the transparent workpiece is constructed of a glass-ceramic material.

A thirty seventh aspect of the present disclosure includes any of the thirty first through the thirty sixth aspects, wherein the defect-forming laser beam comprises a pulsed laser beam forming a laser beam focal line in the transparent workpiece, the laser beam focal line inducing absorption in the transparent workpiece, the induced absorption producing an individual defect of the plurality of defects in the transparent workpiece.

A thirty eighth aspect of the present disclosure includes any of the thirty first through the thirty seventh aspects, wherein the laser beam focal line formed from the pulsed laser beam comprises: a wavelength λ; a spot size $w_o$; and a Rayleigh range $Z_R$ that is greater than $$F_D \frac{\pi w_o^2}{\lambda},$$

where $F_D$ is a dimensionless divergence factor comprising a value of 10 or greater.

A thirty ninth aspect of the present disclosure includes any of the thirty first through the thirty eighth aspects, wherein the removing the portion of the sacrificial layer from the transparent workpiece along the contour comprises directing the infrared laser beam in a sacrificial layer removal pass over the transparent workpiece along the contour to ablate the sacrificial layer covering the plurality of defects.

A fortieth aspect of the present disclosure includes any of the thirty first through the thirty ninth aspects, wherein the removing the portion of the sacrificial layer from the transparent workpiece along the contour comprises chemically removing the sacrificial layer from the transparent workpiece by application of a removal chemical to the sacrificial layer.

A forty first aspect of the present disclosure includes any of the thirty first through the thirty fortieth aspects, wherein the separating the transparent workpiece along the contour results in a glass article having a cut edge conforming to the contour in an as-cut condition, wherein, over any given 100 μm length of the separated contour, a surface of the cut edge deviates from a fitted surface to the cut edge by less than or equal to 10 μm.

A forty second aspect of the present disclosure includes any of the thirty first through the forty first aspects, wherein the textured surface has a Sa value of greater than or equal to 0.3 μm.

A forty third aspect of the present disclosure includes a glass article in an as-cut condition, the glass article comprising: a textured surface having a Sa value greater than or equal to 0.3 μm; a second surface; a plurality of defects where the glass article has been modified by a defect-forming laser beam; and a cut edge extending between the first surface and the second surface, the cut edge comprising a sub-surface damage of less than or equal to 30 μm.

A forty fourth aspect of the present disclosure includes the forty third aspect, wherein: the plurality of defects extend along a contour on the textured surface, the plurality of defects extend through a defect surface extending between the contour on the textured surface and end points of the plurality of defects, and over any given 100 μm length of the contour, a surface of the cut edge deviates from a fitted surface to the cut edge by less than or equal to 10 μm.

A forty fifth aspect of the present disclosure includes any of the forty third through the forty fourth aspects, wherein the glass article comprises a rolled glass sheet.

A forty sixth aspect of the present disclosure includes any of the forty third through the forty fifth aspects, wherein the glass article is constructed of a glass-ceramic material.

A forty seventh aspect of the present disclosure includes any of the forty third through the forty sixth aspects, wherein the glass article comprises boron nitride embedded within the textured surface.

A forty eighth aspect of the present disclosure includes any of the forty third through the forty seventh aspects, wherein the transparent workpiece comprises a thickness extending from the textured surface to the second surface in a direction perpendicular to the textured surface that is greater than or equal to 500 μm.

A forty ninth aspect of the present disclosure includes any of the forty third through the forty eighth aspects, wherein the plurality of defects cover greater than or equal 80% of a surface area of the cut edge.

A fiftieth aspect of the present disclosure includes any of the forty third through the forty ninth aspects, wherein the second surface has an Sa value of greater than or equal to 3 μm.

A fifty first aspect of the present disclosure includes any of the forty third through the fiftieth aspects, wherein each of the plurality of defects comprise modified material of the transparent workpiece that is completely encapsulated within the glass article.

A fifty second aspect of the present disclosure includes any of the forty third through the fifty first aspects, wherein each of the plurality of defects comprise ablated regions having diameters that are less than or equal to 5 μm.

A fifty third aspect of the present disclosure includes any of the fourth third through the fifty second aspects, wherein the ablated regions of the plurality of defects do not extend continuously through a thickness of the transparent workpiece.

A fifty fourth aspect of the present disclosure includes any of the forty third through the fifty third aspects, wherein the plurality of defects comprise a defect length $D_l$, a modified material diameter $D_m$, and a defect aspect ratio A comprising a ratio of $D_l$ to $D_m$, wherein A is greater than or equal to 50:1.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
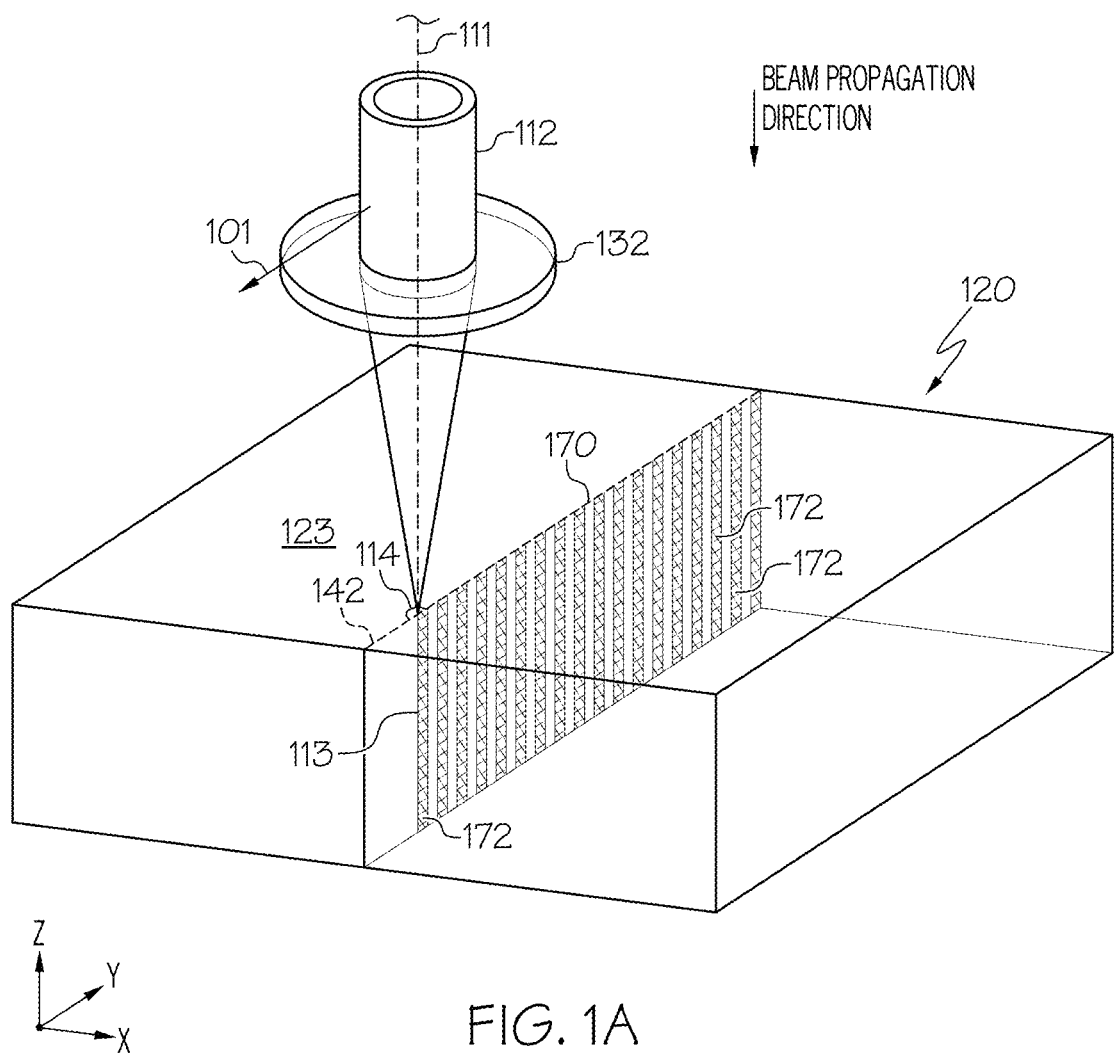
FIG. 1A schematically depicts the formation of a contour of defects in a transparent workpiece with a textured surface, according to one or more embodiments described herein.

Reference will now be made in detail to embodiments of separating a transparent workpiece including a textured surface. It is desired to separate the transparent workpiece along a line of separation that does not significantly deviate from a desired line of separation to reduce the need to perform post-processing steps (e.g., grinding, polishing, and the like) on the separated transparent workpiece for the separated transparent workpiece to possess a desired shape. The textured surface of the transparent workpiece may scatter and distort a laser beam used in laser processing the transparent workpiece, leading to lines of separation that deviate from the desired line of separation, necessitating post-processing steps that remove significant portions of the transparent workpiece to produce a workpiece that conforms to a desired shape, thereby diminishing material utilization and increasing manufacturing costs. The methods described herein utilize the application of sacrificial layers to the workpiece to reduce scattering and distortion of the laser beam caused by the textured surface to form a plurality of defects in the transparent workpiece that guide propagation of a crack at a desired line of separation to reduce the extent of post-processing needed to produce a workpiece having a desired shape.

In particular, the methods described herein include depositing a sacrificial layer onto the textured surface of the transparent workpiece and forming a plurality of defects in the transparent workpiece by directing a defect-forming laser beam directly onto an impingement surface of the sacrificial layer and translating the transparent workpiece and the defect-forming laser beam relative to each other along a path that corresponds to a desired line of separation. In embodiments, the sacrificial layer comprises a refractive index that is between a refractive index of air and a refractive index of the transparent workpiece. Such a refractive index of the sacrificial layer beneficially reduces the wavefront error that accumulates in the defect-forming laser beam, facilitating the defect-forming laser beam maintaining a shape (e.g., a cross-sectional shape of an energy density distribution) and energy density at the textured surface, thereby causing the plurality of defects formed by the defect-forming laser beam to extend through a greater portion of the transparent workpiece and to more closely correspond to a desired shape than when the sacrificial layer is not used. Such defects beneficially cause crack propagation along the desired line of separation in response to stress being applied along the plurality of defects, reducing subsurface damage and the amount of post-processing needed to generate glass articles having a desired shape.

As used herein, the term "textured surface" refers to a surface of a transparent workpiece having a Sa value of greater than or equal to 0.1 µm. It should be understood that the methods described herein may be used for textured surface having a wide range of Sa values. For example, in embodiments, the textured surfaces described herein may have Sa values that are greater than or equal to 0.1 µm and less than or equal to 10 µm. In embodiments, the textured surfaces described herein have Sa values greater than or equal to 0.25 µm and less than or equal to 5 µm. In embodiments, the textured surfaces described herein have Sa values greater than or equal to 0.5 µm and less than or equal to 2.5 µm. Such textured surfaces may result from formation of the transparent workpiece. For example, embodiments may involve laser processing of transparent workpieces that are rolled glass or glass-ceramic sheets, formed by the application of rollers to a glass or glass-ceramic precursor. The contact of the rollers to the precursor may impart a textured surface onto the transparent workpiece. Embodiments may also involve laser processing of glass-ceramic transparent workpieces, where the ceramming process imparts surface texture to the transparent workpiece. Furthermore, the ceramming process may include the use of boron nitride as a lubricant agent between sheets being cerammed, which can leave residual boron nitride embedded in the glass surface after the ceramming is complete and give rise to a textured surface.

As used herein, the term "Ra value" refers to a surface roughness measure of the arithmetic average value of a filtered roughness profile determined from deviations from a centerline of the filtered roughness. For example, an Ra value may be determined based on the relation:

$$Ra = \frac{1}{n}\sum_{i=1}^{n} |H_i - H_{CL}| \qquad (1)$$

where $H_i$ is a surface height measurement of the surface and $H_{CL}$ corresponds to a centerline (e.g., the center between maximum and minimum surface height values) surface height measurement among the data points of the filtered profile. An Sa value may be determined through an areal extrapolation of equation 1 herein. Filter values (e.g., cutoff wavelengths) for determining the Sa values described herein may be found in ISO 25718. Surface height may be measured with a variety of tools, such as an optical interferometer, stylus-based profilometer, or laser confocal microscope. Unless otherwise specified herein, Sa values were measured via a laser confocal microscope. To assess the roughness of the textured surfaces, measurement regions should be used that are as large as is practical, in order to assess variability that may occur over large spatial scales. For example, a transparent workpiece constructed of rolled glass may have inclusions caused by boron nitride particulate that can be of a scale ~100 μm. As such, for the textured surfaces described here, measurement regions of 3×3 mm were typically used to assess Sa. However, for assessing the cut edge surfaces, the thickness of the transparent workpiece limits the practical size of the measurement region, so that regions of at least 100 μm×100 μm in size were more appropriate.

As used herein, the "refractive index of air" or "$n_{air}$" refers to the refractive index of air at a specified wavelength λ of a laser beam used to form defects in a transparent workpiece, or a "defect-forming laser beam." In an example where a defect-forming laser beam has a wavelength λ of 1064 nm, the refractive index of air equals 1.00027408.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

As used herein, the singular forms "a," "an" and "the" include plural referents unless the context clearly dictates otherwise. Thus, for example, reference to "a" component includes aspects having two or more such components, unless the context clearly indicates otherwise.

As used herein, "as-cut condition" refers to a state of a portion of a transparent workpiece immediately after the transparent workpiece has been separated along a plurality of defects formed in the transparent workpiece, without any post-processing steps (e.g., grinding, polishing, etching, roughening, and the like) being applied to the portion of the transparent workpiece. Such separation may occur in response to a stress (e.g., a thermal stress, a mechanical stress, or the like) or other separation means (e.g., a chemical etchant) being applied to the transparent workpiece at the plurality of defects. The separated portion of the transparent workpiece may include a cut edge at which the separation took place. Portions (or entireties) of the plurality of defects may remain in the separated portion at or proximate to the cut edge when the separated portion is in an as-cut condition.

As used herein, "laser processing" comprises directing a laser beam onto and/or into a transparent workpiece. In some embodiments, laser processing further comprises translating the laser beam relative to the transparent workpiece, for example, along a contour line or other pathway. Examples of laser processing include using a laser beam to form a contour comprising a series of defects that extend into the transparent workpiece and using an infrared laser beam to heat the transparent workpiece. Other examples of laser processing including using a laser beam to form a contour comprising a series of defects that extend into the transparent workpiece and using alternative means to separate the transparent workpiece along the series of defects (e.g., mechanical stress, application of a chemical etchant, or the like). Laser processing may separate the transparent workpiece along one or more lines of separation.

As used herein, "beam spot" refers to a cross section of a laser beam (e.g., a beam cross section) at the impingement location of the laser beam at an impingement surface of a transparent workpiece or a sacrificial layer disposed on the transparent workpiece. The impingement surface is the surface of the transparent workpiece or a sacrificial layer disposed on the transparent workpiece upon which the laser beam is first incident. The beam spot is the cross-section at the impingement location. In the embodiments described herein, the beam spot is sometimes referred to as being "axisymmetric" or "non-axisymmetric." As used herein, axisymmetric refers to a shape (e.g., circular) that is symmetric, or appears the same, for any arbitrary rotation angle made about a central axis, and "non-axisymmetric" refers to a shape that is not symmetric for any arbitrary rotation angle made about a central axis. The rotation axis (e.g., the central axis) is most often taken as being the optical axis (axis of propagation) of the laser beam, which is the axis extending in the beam propagation direction, which is referred to herein as the Z-direction.

As used herein, "upstream" and "downstream" refer to the relative position of two locations or components along a beam pathway with respect to a beam source. For example, a first component is upstream from a second component if the first component is closer to the beam source along the path traversed by the laser beam than the second component. A first component is downstream from a second component if the first component is farther from the beam source than the second component along the path traversed by the laser beam (i.e., if the laser beam is incident on the second component prior to being incident on the first component).

As used herein, "laser beam focal line" or "pulsed laser beam focal line" refer to a pattern of interacting (e.g., crossing) light rays of a pulsed laser beam that forms a focal region elongated in the beam propagation direction. In conventional laser processing, a pulsed laser beam is tightly focused to a focal point. The focal point is the point of minimum cross section of the pulsed laser beam, often referred to as the beam "waist", and is situated at a focal plane in a substrate, such as the transparent workpiece. In the elongated focal region of a pulsed laser beam focal line, in contrast, the region of minimum cross section of the pulsed laser beam is no longer a single point, but instead forms a line aligned with the beam propagation direction. A pulsed laser beam focal line is formed by converging light rays of a pulsed laser beam that intersect (e.g., cross) to form a continuous series of focal points aligned with the beam propagation direction. The pulsed laser beam focal lines described herein are formed using a quasi-non-diffracting beam, mathematically defined in detail below.

As used herein, "contour line" corresponds to the set of intersection points of the laser beam with a transparent workpiece resulting from relative motion of the laser beam and the transparent workpiece. A contour line can be a linear, angled, polygonal or curved in shape. A contour line can be closed (i.e. defining an enclosed region on the surface of the transparent workpiece) or open (i.e. not defining an enclosed region on the surface of the transparent workpiece). The contour line represents a boundary along which separation of the transparent workpiece into two or more parts is facilitated. In embodiments, the contour line represents a boundary between a discarded portion of the transparent workpiece and a primary or utilized region of the transparent workpiece.

As used herein, "contour," refers to a set of defects in a transparent workpiece formed by a laser beam through relative motion of a laser beam and the transparent workpiece along a contour line. The defects are spaced apart along the contour line and are wholly contained within the interior of the transparent workpiece or extend through one or more surfaces into the interior of the transparent workpiece. Defects may also extend through the entire thickness of the transparent workpiece. Separation of the transparent workpiece occurs by connecting defects, such as, for example, through propagation of a crack.

As used herein, a "defect" refers to a region of a transparent workpiece that has been modified by a laser beam. Defects include regions of a transparent workpiece having a modified refractive index relative to surrounding unmodified regions of the transparent workpiece. Common defects include structurally modified regions such as void spaces, cracks, scratches, flaws, holes, perforations, densifications, or other deformities in the transparent workpiece produced by a pulsed laser beam focal line. Defects may also be referred to, in various embodiments herein, as defect lines or damage tracks. The defects described herein include material modifications (e.g., refractive index modifications, cracks, void spaces, flaws) that are completely encapsulated within a thickness of the transparent workpiece.

As used herein, an "ablated region" refers to a region of a defect in a transparent workpiece that is devoid of material as a result of an interaction with a laser beam. An ablated region of a defect may include void spaces, cracks, holes, and perforations that result from interaction with a laser beam. That is, an ablated region is a region of the transparent workpiece that was filled with material of the transparent workpiece prior to defect formation that no longer is filled with the material as a result of the interaction with the laser beam. For example, interaction of a laser beam with a surface of the transparent workpiece may result in cracks extending from the point of interaction between the surface and the laser beam. Such cracks are an ablated region.

In embodiments, a defect or damage track is formed through nonlinear filamentation via the Kerr effect through interaction of a laser beam with the transparent workpiece. The nonlinear Kerr effect yields a self-focusing phenomenon by inducing an increase in the refractive index at a central portion of the laser beam, thereby creating a waveguiding effect that counteracts diffraction of the laser beam. In embodiments, defects formed through the Kerr effect are generated by a Gaussian laser beam incident on the transparent workpiece having a power exceeding the critical power $P_{Cr}$, provided by:

$$P_{Cr} = \frac{3.72 * \lambda_o^2}{8 * \pi * n_o * n_2} \qquad (2)$$

Where $n_2$ is the second-order nonlinear refractive index, $\lambda_o$ is the wavelength of the laser beam, and $n_o$ is the refractive index of the transparent workpiece at the wavelength $\lambda_o$. Formula (2) describes the critical power needed to achieve self-focusing for a Gaussian beam shape. For different laser beam profiles and focusing methods, the exact power levels that achieve self-focusing may be different from equation (2).

In embodiments, a defect or damage track is formed through interaction of a pulsed laser beam focal line with the transparent workpiece. As described more fully below, the pulsed laser beam focal line is produced by a pulsed laser. A defect at a particular location along the contour line is formed from a pulsed laser beam focal line produced by a single laser pulse at the particular location, a pulse burst of sub-pulses at the particular location, or multiple laser pulses at the particular location. Relative motion of the laser beam and transparent workpiece along the contour line results in multiple defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. In embodiments, the linear optical absorption of the transparent workpieces described herein is measured by transmitting a non-focused (e.g., collimated) laser beam (e.g., not having a sufficiently high intensity to induce non-linear absorption) through a transparent workpiece. The power of the non-focused laser beam transmitted through the transparent workpiece is then compared to an initial power of the non-focused laser beam to determine a percentage of the light absorbed by the transparent workpiece. The measured absorption values may be normalized for transparent workpiece thickness. In embodiments, the transparent workpieces described herein may have a depth (e.g., thickness) of greater than or equal to 50 microns (μm) and less than or equal to 10 mm (such as greater than or equal to 100 μm and less than or equal to 5 mm, or greater than or equal to 0.5 mm and less than or equal to 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for glass strengthening before or after laser processing the transparent workpiece.

As used herein, "glass-ceramics" are solids prepared by controlled crystallization of a precursor glass and have one or more crystalline phases and a residual glass phase.

As used herein, the term "quasi-non-diffracting beam" is used to describe a laser beam having low beam divergence as mathematically described below. In particular, the laser beam used to form a contour of defects in the embodiments described herein. The laser beam has an intensity distribution $I(X,Y,Z)$, where Z is the beam propagation direction of the laser beam, and X and Y are directions orthogonal to the beam propagation direction, as depicted in the figures. The X-direction and Y-direction may also be referred to as cross-sectional directions and the X-Y plane may be referred to as a cross-sectional plane. The coordinates and directions X, Y, and Z are also referred to herein as x, y, and z; respectively. The intensity distribution of the laser beam in a cross-sectional plane may be referred to as a cross-sectional intensity distribution.

The quasi-non-diffracting laser beam may be formed by impinging a diffracting laser beam (such as a Gaussian beam) into, onto, and/or thorough a phase-altering optical element, such as an adaptive phase-altering optical element (e.g., a spatial light modulator, an adaptive phase plate, a deformable mirror, or the like), a static phase-altering optical element (e.g., a static phase plate, an aspheric optical element, such as an axicon, or the like), to modify the phase of the beam, to reduce beam divergence, and to increase Rayleigh range, as mathematically defined below. Example quasi-non-diffracting beams include Gauss-Bessel beams, Airy beams, Weber beams, and Bessel beams.

Figure 1B:
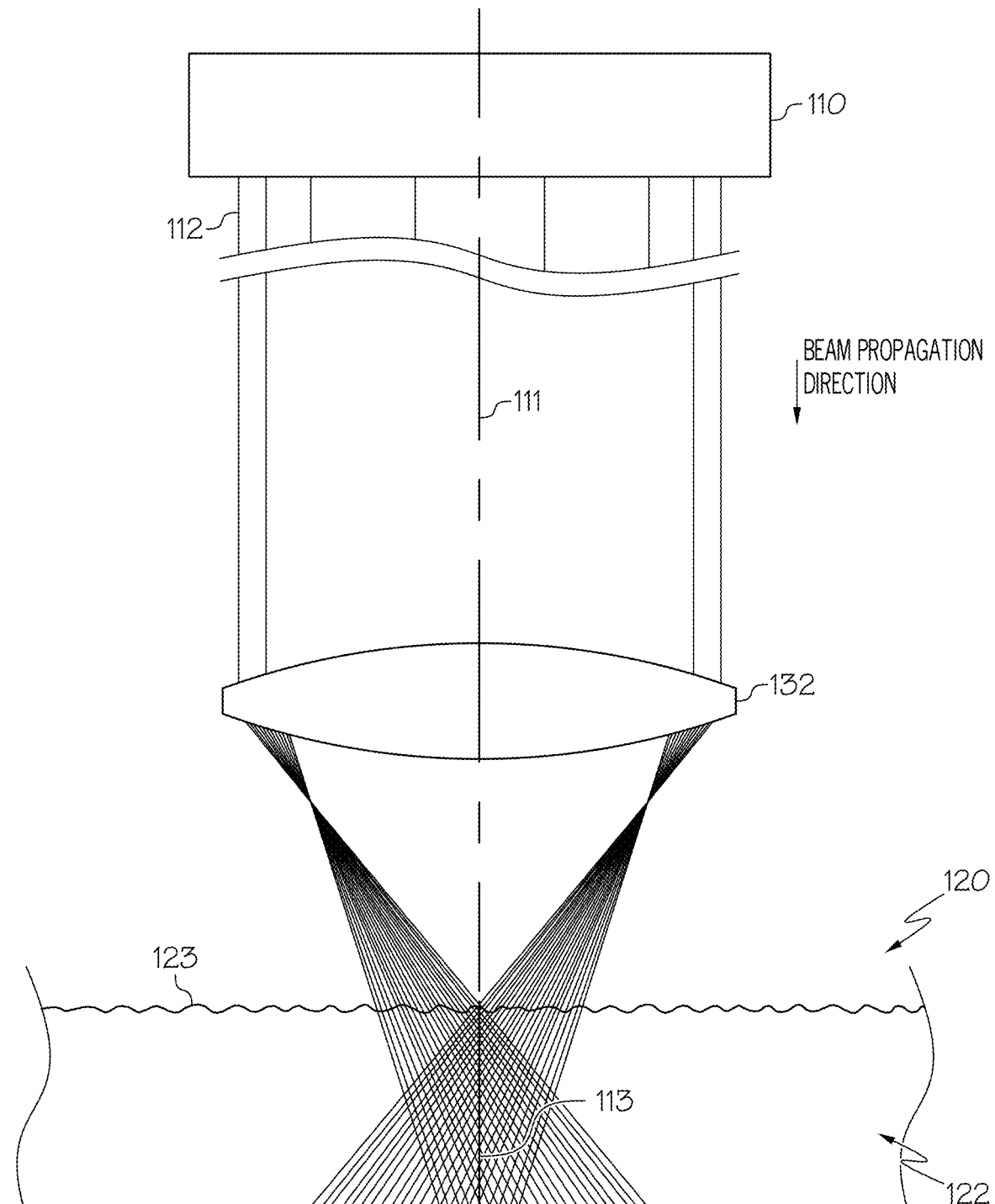
FIG. 1B schematically depicts an example pulsed laser beam focal line during processing of the transparent workpiece, according to one or more embodiments described herein.
Figure 2:
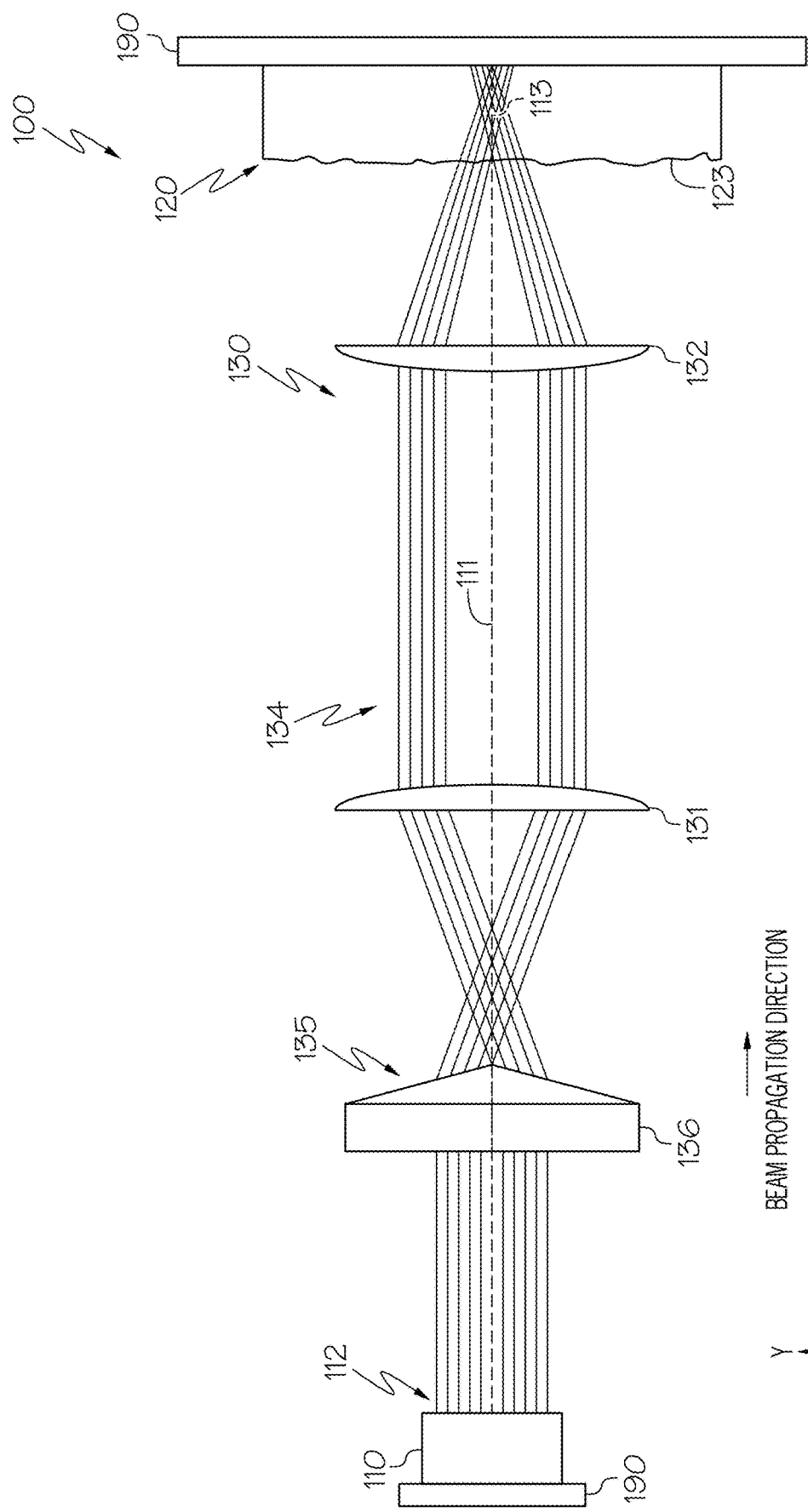
FIG. 2 schematically depicts an optical assembly for laser processing with pulsed laser beam focal lines, according to one or more embodiments described herein.

Referring to FIGS. 1A and 1B and 2, the pulsed laser beam 112 used to form the defects further has an intensity distribution $I(X,Y,Z)$, where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined herein, by propagating the pulsed laser beam 112 (e.g., outputting the pulsed laser beam 112, such as a Gaussian beam, using a pulsed beam source 110) through an aspheric optical element 135, as described in more detail herein with respect to the optical assembly 100 depicted in FIG. 2. Beam divergence refers to the rate of enlargement of the beam cross section in the direction of beam propagation (i.e., the Z-direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto a textured surface 123 of a transparent workpiece 120.

The length of the pulsed laser beam focal line produced from a quasi-non-diffracting beam is determined by the Rayleigh range of the quasi-non-diffracting beam. Particularly, the quasi-non-diffracting beam defines a pulsed laser beam focal line 113 having a first end point and a second end point each defined by locations where the quasi-non-diffracting beam has propagated a distance from the beam waist equal to a Rayleigh range of the quasi-non-diffracting beam. The length of the laser beam focal line corresponds to twice the Rayleigh range of the quasi-non-diffracting beam. A detailed description of the formation of quasi-non-diffracting beams and determining their length, including a generalization of the description of such beams to asymmetric (such as non-axisymmetric) beam cross sectional profiles, is provided in U.S. application Ser. No. 15/718,848 and Dutch Patent Application No. 2017998, which are incorporated by reference in their entireties.

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. The Rayleigh range can also be observed as the distance along the beam axis at which the peak optical intensity observed in a cross sectional profile of the beam decays to one half of its value observed in a cross sectional profile of the beam at the beam waist location (location of maximum intensity). Laser beams with large Rayleigh ranges have low divergence and expand more slowly with distance in the beam propagation direction than laser beams with small Rayleigh ranges.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value. The maximum intensity of a Gaussian beam occurs at the center (x=0 and y=0 (Cartesian) or r=0 (cylindrical)) of the intensity distribution and radial extent used to determine spot size is measured relative to the center.

Beams with Gaussian intensity profiles may be less preferred for laser processing to form a contour of defects because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances (low Rayleigh range). To achieve low divergence (high Rayleigh range), it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

Non-diffracting or quasi-non-diffracting beams generally have complicated intensity profiles, such as those that decrease non-monotonically vs. radius. By analogy to a Gaussian beam, an effective spot size $w_{o,eff}$ can be defined for any beam, even non-axisymmetric beams, as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range $Z_R$ based on the effective spot size $w_{o,eff}$ for axisymmetric beams can be specified as non-diffracting or quasi-non-diffracting beams for forming damage regions in Equation (3), below:

$$Z_R > F_D \frac{\pi w_{0,eff}^2}{\lambda} \quad (3)$$

where $F_D$ is a dimensionless divergence factor having a value of at least 10, in an embodiment at least 50, in an embodiment at least 100, in an embodiment at least 250, in particular at least 500 and in another embodiment at least 1000. In a further embodiment $F_D$ can be in the range from 10 to 2000, in particular in the range from 50 to 1500 and furthermore in particular in the range from 100 to 1000. For a non-diffracting or quasi-non-diffracting beam the distance (Rayleigh range), $Z_R$ in Equation (1), over which the effective spot size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (1) with a value of $F_D \geq 10$. As the value of $F_D$ increases, the pulsed laser beam 112 approaches a more nearly perfectly non-diffracting state. Thus, as the value of $F_D$ increases, the length of the laser beam focal line increases, facilitating the formation of longer defects.

Additional information about Rayleigh range, beam divergence, intensity distribution, axisymmetric and non-axisymmetric beams, and spot size as used herein can also be found in the international standards ISO 11146-1:2005(E) entitled "Lasers and laser-related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

Referring now to FIGS. 1A and 1B, a transparent workpiece 120 comprising a textured surface 123 is schematically depicted undergoing laser processing according to the methods described herein. In particular, FIGS. 1A and 1B schematically depict directing a pulsed laser beam 112 that is output by a pulsed beam source 110, such as a Gaussian pulsed beam source, and oriented along a beam pathway 111 into the transparent workpiece 120 to form a defect 172 in the transparent workpiece 120, for example, extending into the transparent workpiece 120. The pulsed laser beam 112 propagates along the beam pathway 111 and is oriented such that the pulsed laser beam 112 may be focused into a pulsed laser beam focal line 113 within the transparent workpiece 120, for example, using an aspheric optical element 135 and one or more lenses (FIG. 2). The pulsed laser beam focal line 113 generates an induced absorption within the transparent workpiece 120 to produce the defect 172 within the transparent workpiece 120 that may extend into the transparent workpiece 120. Furthermore, a contour 170 of defects 172 may be formed in the transparent workpiece 120 by translating at least one of the pulsed laser beam 112 and the transparent workpiece 120 relative to one another such that the pulsed laser beam 112 translates relative to the transparent workpiece 120 in a translation direction 101. The pulsed laser beam 112 forms a beam spot 114 projected onto textured surface 123 of the transparent workpiece 120.

Referring also to FIG. 2, the pulsed laser beam 112 may be focused into the pulsed laser beam focal line 113 using a lens 132, which is the final focusing element in an optical assembly 100. While a single lens 132 is depicted in FIGS. 1A and 1B, the optical assembly 100 further comprises an aspheric optical element 135, which modifies the pulsed laser beam 112 such that the pulsed laser beam 112 has a quasi-non-diffracting character downstream the aspheric optical element 135. Thus, when the portion of the pulsed laser beam 112 shown in FIGS. 1A and 1B impinges the lens 132, the pulsed laser beam 112 has a quasi-non-diffracting character. Furthermore, some embodiments may include a lens assembly 130 including, for example a first lens 131 and a second lens 132, and repetitions thereof (FIG. 2) to focus the pulsed laser beam 112 into the pulsed laser beam focal line 113. Other standard optical elements (e.g. prisms, beam splitters etc.) may also be included in lens assembly 130.

As depicted in FIG. 1A, the pulsed laser beam 112 may comprise an annular shape when impinging the lens 132. While the lens 132 is depicted focusing the pulsed laser beam 112 into the pulsed laser beam focal line 113 in FIG. 1A, other embodiments may use the aspheric optical element 135 (FIG. 2), which modifies the pulsed laser beam 112 such that the pulsed laser beam 112 has a quasi-non-diffracting character downstream of the aspheric optical element 135, to also focus the pulsed laser beam 112 into the pulsed laser beam focal line 113. In other words, in some embodiments, the lens 132 may be the final focusing element and in other embodiments, the aspheric optical element 135 may be the final focusing element. The pulsed laser beam focal line 113 may have a length in a range of from about 0.1 mm to about 100 mm or in a range of from about 0.1 mm to about 10 mm. Various embodiments may be configured to have a pulsed laser beam focal line 113 with a length l of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. The length of the pulsed laser beam focal line 113 may be selected based on the particular laser processing goals. As one example, for thicker transparent workpieces 120, it may be advantageous to form longer pulsed laser beam focal lines 113. As another example, if defects 172 extending into only discrete depth sections of the transparent workpiece 120 are desired, it may be advantageous to form shorter pulsed laser beam focal lines 113.

Referring now to FIG. 2, the optical assembly 100 for producing a pulsed laser beam 112 that is quasi-non-diffracting and forms the pulsed laser beam focal line 113 at the transparent workpiece 120 using the aspheric optical element 135 (e.g., an axicon 136) is schematically depicted. The optical assembly 100 includes a pulsed beam source 110 that outputs the pulsed laser beam 112, and the lens assembly 130 comprising the first lens 131 and the second lens 132. The transparent workpiece 120 may be positioned such that the pulsed laser beam 112 output by the pulsed beam source 110 irradiates transparent workpiece 120, for example, after traversing the aspheric optical element 135 and thereafter, both the first lens 131 and the second lens 132.

The aspheric optical element 135 is positioned within the beam pathway 111 between the pulsed beam source 110 and the transparent workpiece 120. In operation, propagating the pulsed laser beam 112, e.g., an incoming Gaussian beam, through the aspheric optical element 135 may alter, for example, phase alter, the pulsed laser beam 112 such that the portion of the pulsed laser beam 112 propagating beyond the aspheric optical element 135 is quasi-non-diffracting, as described above. The aspheric optical element 135 may comprise any optical element comprising an aspherical shape. In some embodiments, the aspheric optical element 135 may comprise a conical wavefront producing optical element, such as an axicon lens, for example, a negative refractive axicon lens (e.g., negative axicon), a positive refractive axicon lens, a reflective axicon lens, a diffractive axicon lens, a phase axicon, a diffractive optic, a cubically shaped optical element, or the like.

While the optical assembly 100 is primarily described as altering the pulsed laser beam 112 into a quasi-non-diffracting beam using the aspheric optical element 135, it should be understood that a quasi-non-diffracting beam may also be formed by other phase-altering optical elements, such as a spatial light modulator, an adaptive phase plate, a static phase plate, a deformable mirror, diffractive optical grating, or the like. Each of these phase-altering optical elements, including the aspheric optical element 135, modify the phase of the pulsed laser beam 112, to reduce beam divergence, increase Rayleigh range, and form a quasi-non-diffracting beam as mathematically defined herein.

Referring still to FIG. 2, the lens assembly 130 comprises two lenses, with the first lens 131 positioned upstream from the second lens 132. The first lens 131 may collimate the pulsed laser beam 112 within a collimation space 134 between the first lens 131 and the second lens 132. Further, the most downstream positioned second lens 132 of the lens assembly 130 may focus the pulsed laser beam 112 into the transparent workpiece 120. In some embodiments, the first lens 131 and the second lens 132 each comprise plano-convex lenses. When the first lens 131 and the second lens 132 each comprise plano-convex lenses, the curvature of the first lens 131 and the second lens 132 may each be oriented toward the collimation space 134. In other embodiments, the first lens 131 may comprise a collimating lens and the second lens 132 may comprise a meniscus lens, an asphere, or another higher-order corrected focusing lens. In operation, the lens assembly 130 may control the position of the pulsed laser beam focal line 113 along the beam pathway 111. In further embodiments, the lens assembly 130 may comprise an 8F lens assembly, a 4F lens assembly comprising a single set of first and second lenses 131, 132, or any other known or yet to be developed lens assembly 130 for focusing the pulsed laser beam 112 into the pulsed laser beam focal line 113. Moreover, it should be understood that some embodiments may not include the lens assembly 130 and instead, the aspheric optical element 135 may focus the pulsed laser beam 112 into the pulsed laser beam focal line 113. For example, an aspheric optical element may both transform pulsed laser beam 112 into a quasi-non-diffracting laser beam and focus the quasi-non-diffracting laser beam into pulsed laser beam focal line 113.

Referring again to FIGS. 1A-2, the pulsed beam source 110 is configured to output pulsed laser beam 112. In operation, the defects 172 of the contour 170 are produced by interaction of the transparent workpiece 120 with the pulsed laser beam 112 output by the pulsed beam source 110 as modified by the aspheric optical element 135 and/or lens assembly 130. In operation, the pulsed laser beam 112 output by the pulsed beam source 110 may create multi-photon absorption (MPA) in the transparent workpiece 120. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

In some embodiments, the pulsed beam source 110 may output a pulsed laser beam 112 comprising a wavelength of, for example, 1064 nm, 1030 nm, 532 nm, 530 nm, 355 nm, 343 nm, or 266 nm, or 215 nm. Further, the pulsed laser beam 112 used to form defects 172 in the transparent workpiece 120 may be well suited for materials that are transparent to the selected pulsed laser wavelength. Suitable laser wavelengths for forming defects 172 are wavelengths at which the combined losses of linear absorption and scattering by the transparent workpiece 120 (e.g., after propagation through the textured surface 123) are sufficiently low. In embodiments, the combined losses due to linear absorption and scattering by the transparent workpiece 120 at the laser wavelength are less than 20%/mm, or less than 15%/mm, or less than 10%/mm, or less than 5%/mm, or less than 1%/mm, such as 0.5%/mm to 20%/mm, 1%/mm to 10%/mm, or 1%/mm to 5%/mm, for example, 1%/mm, 2.5%/mm, 5%/mm, 10%/mm, 15%/mm, or any range having any two of these values as endpoints, or any open-ended range having any of these values as a lower bound.

As used herein, the dimension "/mm" means per millimeter of distance within the transparent workpiece 120 in the beam propagation direction of the pulsed laser beam 112 (i.e., the Z-direction). Representative laser wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other laser wavelengths in the ultraviolet, visible, and infrared portions of the spectrum that satisfy the combined linear absorption and scattering loss requirement for a given substrate material can also be used.

Referring still to FIGS. 1A-2, in operation, the contour 170 may be formed in the transparent workpiece 120 by irradiating a contour line 142 with the pulsed laser beam 112 and translating at least one of the pulsed laser beam 112 and the transparent workpiece 120 relative to each other along the contour line 142 in the translation direction 101 to form the defects 172 of the contour 170. While the contour 170 depicted in FIG. 1A is linear, it should be understood that the contour 170 may be non-linear, for example, curved. Further, in some embodiments, the contour 170 may be a closed contour, such as a circle, rectangles, ellipses, squares, hexagons, ovals, regular geometric shapes, irregular shapes, polygonal shapes, arbitrary shapes, and the like. In embodiments, the contour line 142 represents a boundary between a used portion of the transparent workpiece 120 (e.g., incorporated into a glass article) and a discarded portion of the transparent workpiece 120.

Directing or localizing the pulsed laser beam 112 into the transparent workpiece 120 generates an induced absorption (e.g., MPA) within the transparent workpiece 120, and deposits enough energy to break chemical bonds in the transparent workpiece 120 at spaced locations along the contour line 142 to form the defects 172. According to one or more embodiments, the pulsed laser beam 112 may be translated across the transparent workpiece 120 by motion of the transparent workpiece 120 (e.g., motion of a translation stage 190 coupled to the transparent workpiece 120), motion of the pulsed laser beam 112 (e.g., motion of the pulsed laser beam focal line 113), or motion of both the transparent workpiece 120 and the pulsed laser beam focal line 113. By translating at least one of the pulsed laser beam focal line 113 relative to the transparent workpiece 120, the plurality of defects 172 may be formed in the transparent workpiece 120.

In some embodiments, the defects 172 may generally be spaced apart from one another by a distance along the contour 170 of from 0.1 µm to 500 µm, such as, 1 µm to 200 µm, 2 µm to 100 µm, or 5 µm to 20 µm, 0.1 µm to 50 µm, 5 µm to 15 µm, 5 µm to 12 µm, 7 µm to 15 µm, 8 µm to 15 µm, or 8 µm to 12 µm, such as 50 µm or less, 45 µm or less, 40 µm or less, 35 µm or less, 30 µm or less, 25 µm or less, 20 µm or less, 15 µm or less, 10 µm or less, such as 100 µm, 75 µm, 50 µm, 40 µm, 30 µm, 25 µm, 10 µm, 5 µm, or any range having any two of these values as endpoints, or any open-ended range having any of these values as a lower bound. While not intending to be limited by theory, increasing the spacing distance between adjacent defects 172 may increase the processing speed (i.e., reducing processing time) and decreasing the spacing distance between adjacent defects 172 may reduce the break resistance of the contour 170 of defects 172. Further, the translation of the transparent workpiece 120 relative to the pulsed laser beam 112 may be performed by moving the transparent workpiece 120 and/or the pulsed beam source 110 using one or more translation stages 190.

Referring now to FIGS. 1A-3, in embodiments, the defects 172 of the one or more contours 170 are formed with pulse bursts 50 having at least two sub-pulses 51. In such embodiments, the force necessary to separate the transparent workpiece 120 along contour 170 (i.e. the break resistance) is reduced compared to the break resistance of a contour 170 of the same shape with the same spacing between adjacent defects 172 in an identical transparent workpiece 120 that is formed using a single pulse laser having the same energy as the combined energies of the sub-pulses of the pulse burst 50. A pulse burst (such as pulse burst 50) is a short and fast grouping of sub-pulses (i.e., a tight cluster of sub-pulses, such as sub-pulses 51) that are emitted by the laser and interact with the material (i.e. the transparent workpiece 120). The use of pulse bursts 50 (as opposed to a single pulse operation) increases the size (e.g., the cross-sectional size) of the defects 172, which facilitates the connection of adjacent defects 172 when separating the transparent workpiece 120 along the contour 170, thereby minimizing crack formation away from contour 170 in the separated sections of the transparent workpiece 120.

Referring still to FIGS. 1A-3, in some embodiments, pulses produced by the pulsed beam source 110 are produced in pulse bursts 50 of two sub-pulses 51 or more per pulse burst 50, such as from 2 to 30 sub-pulses 51 per pulse burst 50 or from 5 to 20 sub-pulses 51 per pulse burst 50. Furthermore, the energy required to modify the transparent workpiece 120 is the pulse energy, which may be described in terms of pulse burst energy (i.e., the energy contained within a pulse burst 50 where each pulse burst 50 contains a series of sub-pulses 51; that is, the pulse burst energy is the combined energy of all sub-pulses within the pulse burst). The pulse energy (for example, pulse burst energy) may be from 25 µJ to 1000 µJ or 25 µJ to 750 µJ, such as from 100 µJ to 600 µJ, 50 µJ to 500 µJ, or from 50 µJ to 250 µJ, for example, 25 µJ, 50 µJ, 75 µJ, 100 µJ, 200 µJ, 250 µJ, 300 µJ, 400 µJ, 500 µJ, 600 µJ, 750 µJ, or any range having any two of these values as endpoints, or any open-ended range having any of these values as a lower bound.

Figure 3:
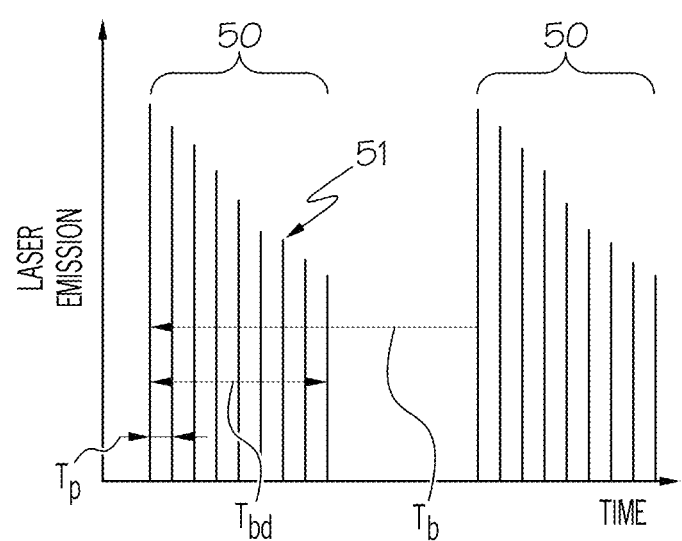
FIG. 3 graphically depicts the relative intensity of laser pulses within an example pulse burst vs. time, according to one or more embodiments described herein.
Figure 4A:
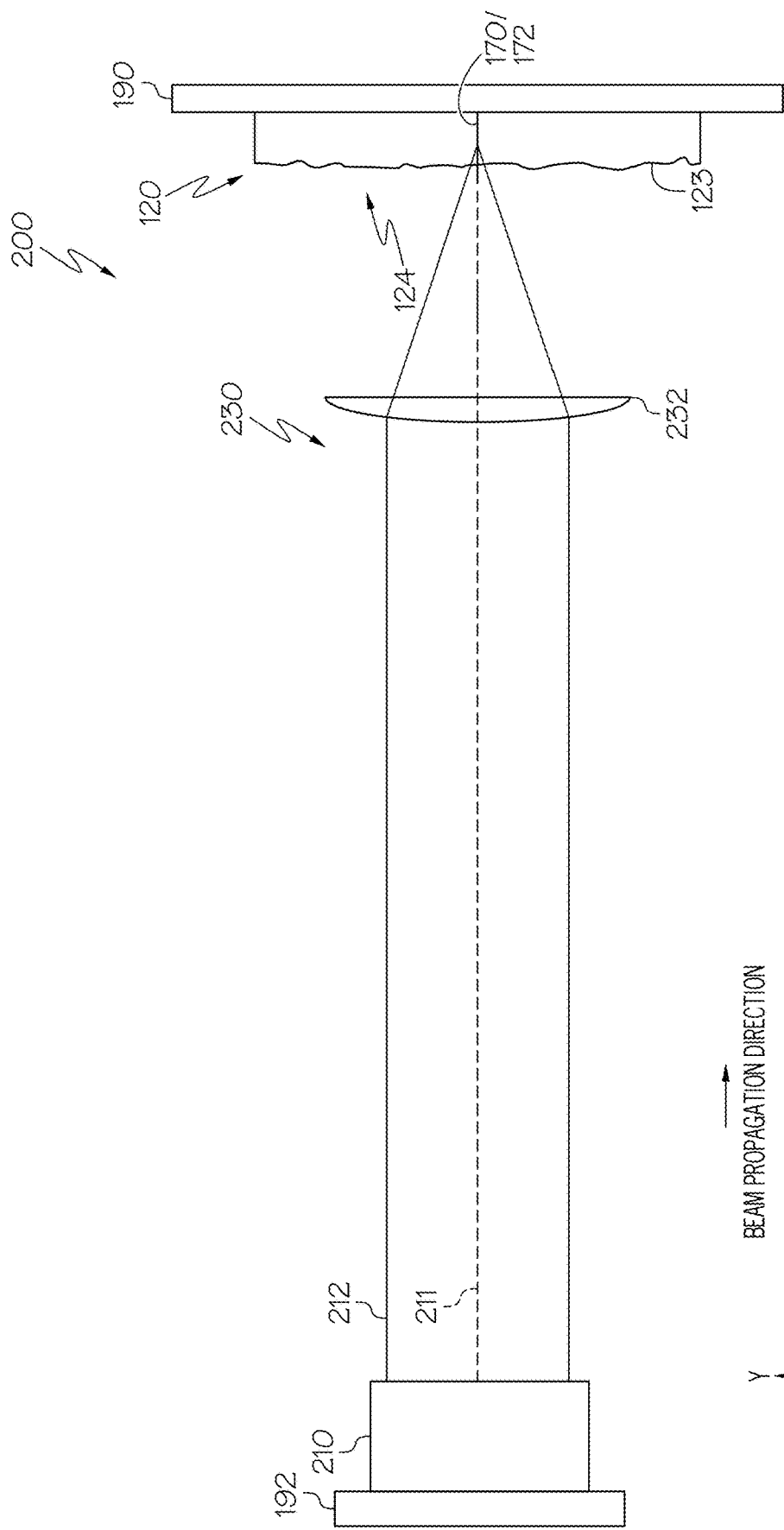
FIG. 4A schematically depicts an optical assembly for laser processing with an infrared laser beam, according to one or more embodiments described herein.
Figure 4B:
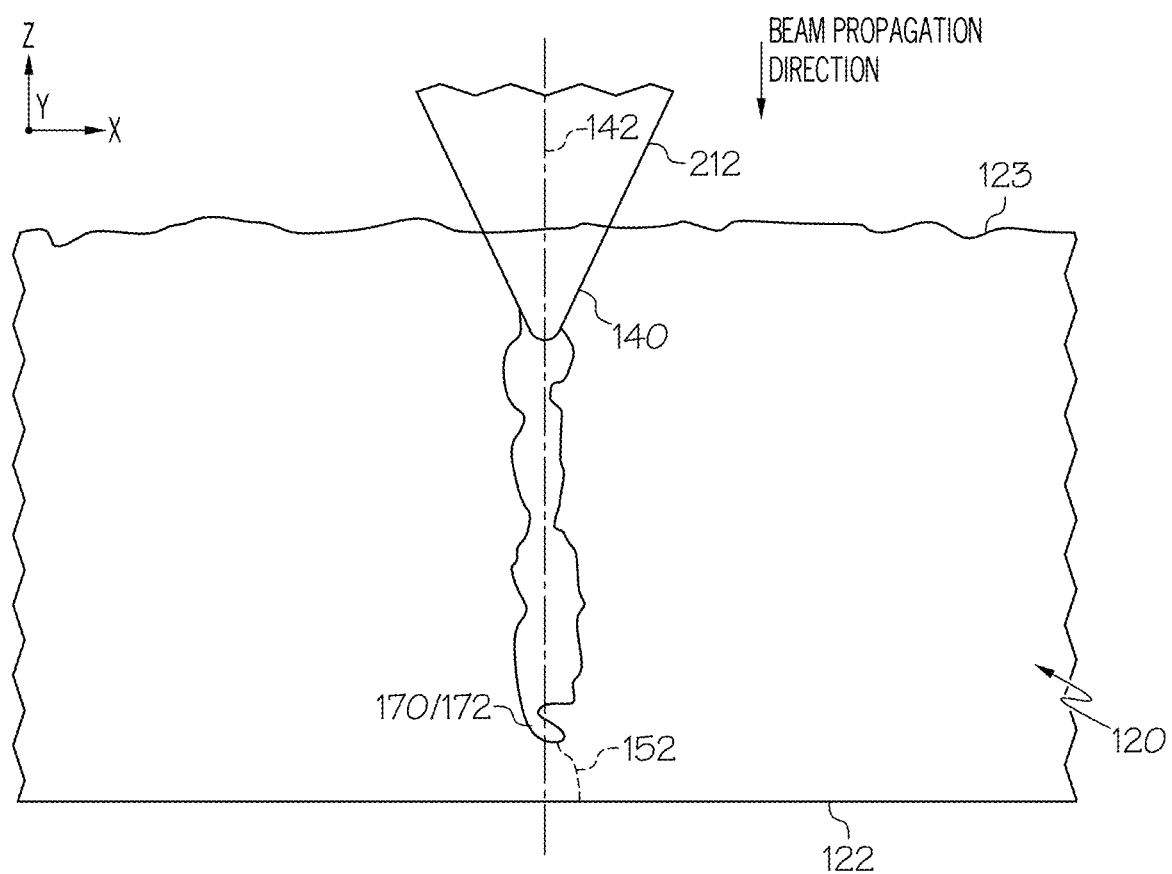
FIG. 4B schematically depicts the infrared laser beam depicted in FIG. 4A incident on a textured surface of a transparent workpiece, according to one or more embodiments described herein.

Referring now to FIGS. 4A and 4B, after forming the contour 170 of defects 172 along the contour line 142 in the transparent workpiece 120 using, for example, one of the embodiments according FIGS. 1-3, the transparent workpiece 120 may be further acted upon in a subsequent separating step to induce separation of the transparent workpiece 120 along the contour line 142 (i.e., along the contour 170 of defects 172). In embodiments, the subsequent separating step includes directing an infrared laser beam 212 onto the transparent workpiece 120 to apply a thermal stress to the transparent workpiece 120. The applied thermal stress induces separation that extends between adjacent defects 172 in the transparent workpiece 120 along the contour line 142. In the transparent workpiece 120, this separating may include propagation of a crack along the contour line 142.

Without being bound by theory, the infrared laser beam 212 is a controlled heat source that rapidly increases the temperature of the transparent workpiece 120 at or near the contour line 142, modifying material of the transparent workpiece 120 along or near the contour line 142 to induce separation of the material extending between adjacent defects 172. In addition, this rapid heating may build compressive stress in the transparent workpiece 120 on or adjacent to the contour 170. Since the area of the heated surface of transparent workpiece 120 is relatively small and shallow when compared to the overall surface area of the transparent workpiece 120, the heated area cools relatively rapidly. The resultant temperature gradient induces tensile stress in the transparent workpiece 120 sufficient to propagate a crack along the contour 170 and through the depth of the transparent workpiece 120, resulting in full separation of the transparent workpiece 120. Without being bound by theory, it is believed that the tensile stress may be caused by expansion of the glass (i.e., changed density) in portions of the workpiece with higher local temperature induced by infrared laser beam 212.

FIG. 4A depicts an optical assembly 200 comprising an infrared beam source 210 configured to generate the infrared laser beam 212. The infrared beam source 210, which may comprise a carbon dioxide laser (a "$CO_2$ laser"), a carbon monoxide laser (a "CO laser"), a solid-state laser, a laser diode, or combinations thereof. The infrared laser beam 212 comprises a wavelength that is readily absorbed by the transparent workpiece 120, for example, a wavelength ranging from 1.2 µm to 13 µm, such as, a range of 4 µm to 12 µm. The power of the infrared laser beam 212 may be from about 10 W to about 4000 W, for example 100 W, 250 W, 500 W, 750 W, 1000 W, or the like. Further, the infrared beam source 210 may comprises a continuous wave laser or a pulsed laser. The optical assembly 200 further comprises a lens assembly 230 that includes a lens 232 for concentrating the infrared laser beam 212, to create a specific spot diameter on the transparent workpiece 120. The spot diameter at the surface of the workpiece is generally greater than or equal to 1 mm and less than or equal to 15 mm, such as greater than or equal to 2 mm and less than or equal to 10 mm, or greater than or equal to 4 mm and less than or equal to 8 mm. It is desirable to keep the spot size small enough such that the local temperature of the glass is significantly increased and thermal stress is generated and a crack generated, but to not make the spot size so small and laser intensity so high that the glass is locally ablated or damaged in an uncontrolled manner. The infrared laser spot is made to traverse along the defect contour 170, which propagates a crack from one defect 172 to the next. The infrared beam spot size at the transparent workpiece 120, and available infrared laser power dictate the speed at which the infrared laser beam 212 may be translated to affect such crack propagation, with higher speeds being enabled by higher laser powers. In operation, the infrared laser beam 212 propagates along an infrared beam pathway 211 and is oriented such that the infrared laser beam 212 may be directed onto the transparent workpiece 120, for example, and formed into a desired spot size on the textured surface 123 of the transparent workpiece 120 using the lens 232.

Referring now to FIG. 4B, a cross section of the transparent workpiece 120 with a contour 170 of defects 172 during laser processing with the infrared laser beam 212 is schematically depicted. In FIG. 4B, the infrared laser beam 212 is directed onto the transparent workpiece 120 using the optical assembly 200 of FIG. 4 and comprises a Gaussian intensity profile at the transparent workpiece 120. In addition, in FIG. 4B, the infrared laser beam 212 is directed onto the transparent workpiece 120 in alignment with the contour 170 of defects 172 and thus in alignment with the contour line 142. Because the infrared laser beam 212 comprises a Gaussian energy distribution, interaction of the infrared laser beam 212 with the transparent workpiece 120 forms a thermal affected area 140 having a Gaussian shape. The thermal affected area 140 corresponds to the portions of transparent workpiece 120 that absorb the infrared laser beam 212 and receive sufficient energy to produce thermal stresses sufficient to induce separation of transparent workpiece 120 along the contour 170. That is, the thermal affected area 140 comprises a portion the transparent workpiece 120 into which thermal energy sufficient to induce separation of the contour 170 of defects 172 is applied. In embodiments, the thermal affected area 140 induces propagation of a crack 150 the transparent workpiece 120. In the depicted example, the crack 150 extends through an entirety of the thickness of the transparent workpiece 120 such that the thermal affected area 140 is sufficient to induce separation of the transparent workpiece 120 along the crack 150.

As depicted in FIG. 4B, the defects 172 formed as a result of the process described herein with respect to FIGS. 1-3 do not always extend through the entirety of the transparent workpiece 120. Such defects 172 may result even if the pulsed laser beam focal line 113 possesses a length that is greater than the thickness of the transparent workpiece 120. For example, the textured surface 123 may distort and scatter the pulsed laser beam focal line 113, thereby modifying the energy density distribution of the pulsed laser beam focal line 113. As a result of such distortion, after traveling through a portion of the transparent workpiece 120, the pulsed laser beam focal line 113 may not possess the requisite energy density to modify the transparent workpiece 120 such that at least a portion of the transparent workpiece 120 is not modified by the pulsed laser beam focal line 113. Such an unmodified portion of the transparent workpiece 120 renders the propagation of the crack 150 unpredictable. In the example, the crack 150 significantly deviates from the contour 170 in the portion of the transparent workpiece 120 to which the depicted defect 172 does not extend.

Distortions of the pulsed laser beam focal line 113 caused by the textured surface 123 may also cause the defects 172 to possess a non-uniform cross-sectional shape (e.g., the X-Y plane) as a function of distance from the (e.g., in the Z-direction) from the textured surface 123. Such cross-sectional deviations may cause the crack 150 to propagate between adjacent ones of the defects 172 (e.g., separated in the Y-direction in the example depicted) in a manner that deviates from the contour 170. As a result, while the application of the infrared laser beam 212 may result in separation of the transparent workpiece 120, the line of separation (e.g., the crack 150) may significantly depart from the contour 170 in an unpredictable manner. Such unpredictability results in process waste because the transparent workpiece 120 may be processed using a contour providing allowances for such crack deviations.

Figure 5A:
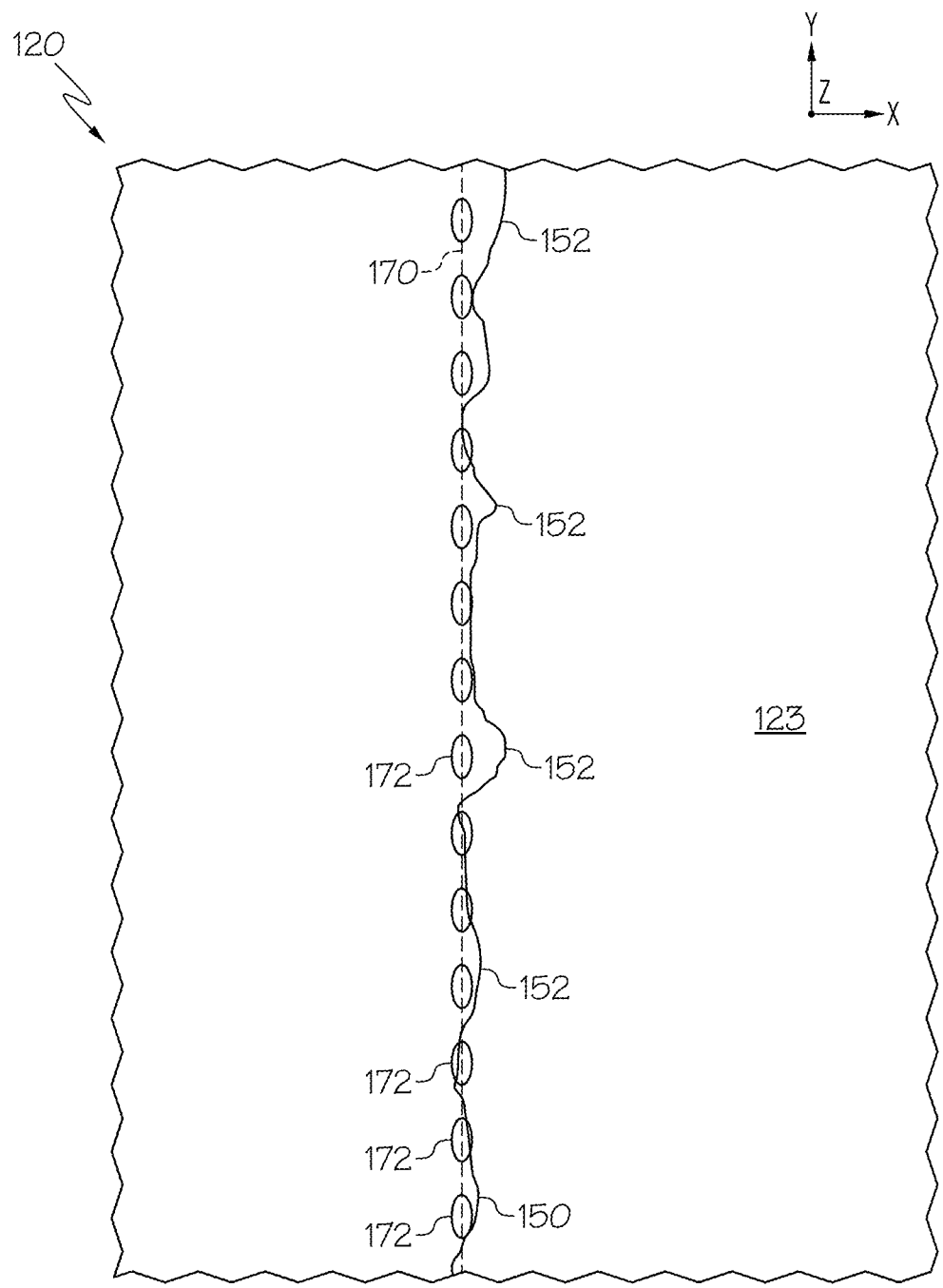
FIG. 5A schematically depicts the transparent workpiece of FIG. 1A comprising a plurality of defects extending along a contour and a line of separation, according to one or more embodiments described herein.

FIG. 5A depicts a perspective view of the transparent workpiece 120 during separation thereof. As depicted the transparent workpiece 120 includes a plurality of defects 172. At the textured surface 123, the plurality of defects 172 possess an elliptical cross-section (e.g., in the X-Y plane). For example, in embodiments, the optical assembly 100 described herein with respect to FIG. 2 may impart an elliptical cross-sectional shape on the pulsed laser beam 112 such that the pulsed laser beam focal line 113 has an elliptical cross-section in the X-Y plane. In embodiments, the plurality of defects 172 may possess an alternative shape (e.g., possessing an asymmetry such that the defects 172 are greater in size along the direction of extension of the contour 170, or in the Y-direction of FIG. 5). In the depicted in example, the defects 172 have a major axis extending along the contour 170. Defects 172 possessing such a shape beneficially guide propagation of a crack 150 induced by stress (e.g., via the infrared laser beam 212 described with respect to FIGS. 4A and 4B) along the contour 170, thereby reducing the threshold amount of stress to induce crack propagation. Guiding propagation of the crack 150 along the contour 170 also beneficially ensures high edge strength of a separated portion of the transparent workpiece 120 by reducing an amount that the crack 150 propagates in a direction perpendicular to the contour 170 (e.g., in the X-direction).

However, as described herein with respect to FIG. 4B, the textured surface 123 may modify the cross-sectional shape of the pulsed laser beam focal line 113 as the pulsed laser beam focal line 113 propagates through the transparent workpiece 120. As a result, the defects 172 may not possess the elliptical profile depicted in FIG. 5A in regions of the transparent workpiece 120 beneath the textured surface 123. Such cross-sectional deviations may diminish the crack-guiding propensity of the defects 172, causing deviations 152 in the crack 150 in a direction (e.g., the X-direction) that is perpendicular to the contour 170. As such, the textured surface 123 may result in the transparent workpiece 120 separating along a line of separation that significantly deviates from an intended line of separation. Additionally, the plurality of defects 172 may not extend through an entirety of the thickness of the transparent workpiece 120. As a result, propagation of the crack 150 through the thickness of the transparent workpiece 120 (e.g., in the Z-direction) may also deviate from the contour 170.

Figure 5B:
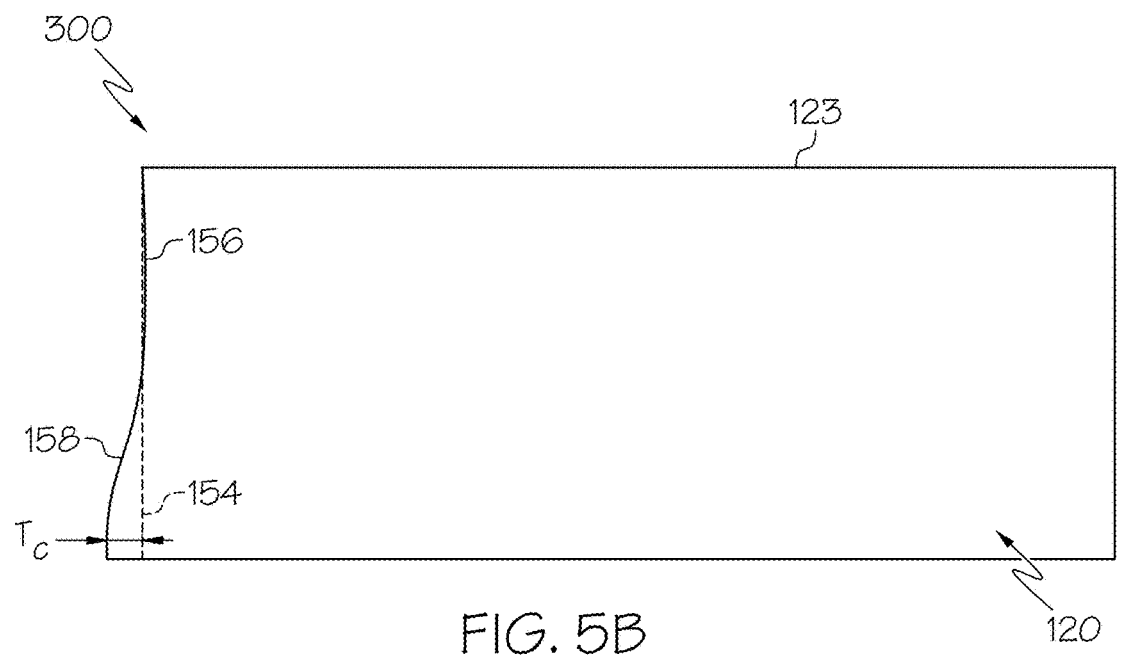
FIG. 5B schematically depicts a separated portion of the transparent workpiece of FIG. 1A at a cut edge, according to one or more embodiments described herein.

FIG. 5B depicts a cross-sectional view of a separated portion 300 of the transparent workpiece 120. For example, the separated portion 300 may result from separating the transparent workpiece 120 described with respect to FIG. 5A along the crack 150. The separated portion 300 includes a cut edge 156 that may correspond to the crack 150. The cut edge 156 includes a cantilever curl 158 where the cut edge 156 deviates from a desired line of separation 154 by a thickness $T_c$. The cantilever curl 158 results from the defect 172 not extending through the entirety of the thickness of the transparent workpiece 120 and failing to guide the crack 150 when the crack 150 propagates through the thickness of the transparent workpiece 120. In examples, the thickness $T_c$ of the cantilever curl in the direction perpendicular to the desired line of separation 154 may be greater than or equal to 100 μm (e.g., greater than or equal to 100 μm and less than or equal to 150 μm). As such, significant amounts of post-processing may be required to provide a cut edge 156 that corresponds to the desired line of separation 154. Given the potential for such large deviations from the desired line of separation 154, laser processing of the transparent substrate 120 by directing the pulsed laser beam 112 directly onto the textured surface 123 may utilize contour lines that are significantly offset from the desired line of separation 154, increasing material waste.

Figure 5C:
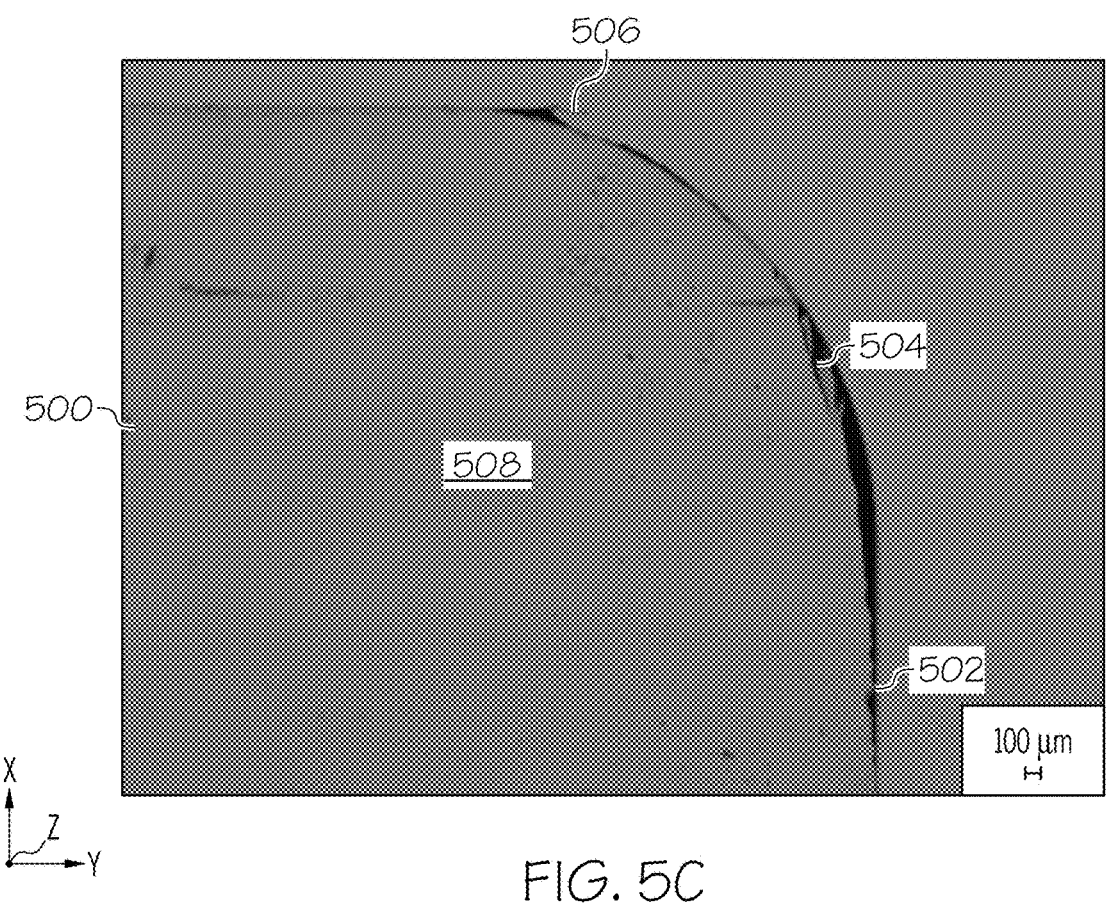
FIG. 5C depicts a view of a transparent workpiece with a textured surface that is separated along a curved contour, according to one or more embodiments described herein.

As another example, FIG. 5C depicts a top view of a separated portion 500 of a transparent workpiece processed via the laser processing methods described herein. The separated portion 500 includes a textured surface 508 and a cut edge 502 including a curved contour. As a result of defects produced with laser processing method described herein not extending through an entirety of the thickness of the separated portion 500, the cut edge 502 includes chips 504 where the cut edge 502 extends inward from the curved contour by approximately 100 μm and adhered glass 506 extending outward from the curved contour by approximately 150 μm. Such chips 504 and adhered glass 506 may particularly result from contours where the contour direction changes rapidly with location, such as curved contours having a radius of curvature of less than or equal to 10 mm. To provide the separated portion 500 with a relatively strong outer edge at the cut edge 502, the cut edge 502 may be subjected to grinding and polishing to remove the chips 504 and the adhered glass 506. Removing upwards of 100 μm of material from the cut edge 502 represents an amount of material removal that significantly exceeds typical subsurface damage associated with laser processing of transparent substrates (e.g., less than or equal to 30 μm). As such, textured surfaces may cause additional material waste when curved contours are desired.

Figure 6A:
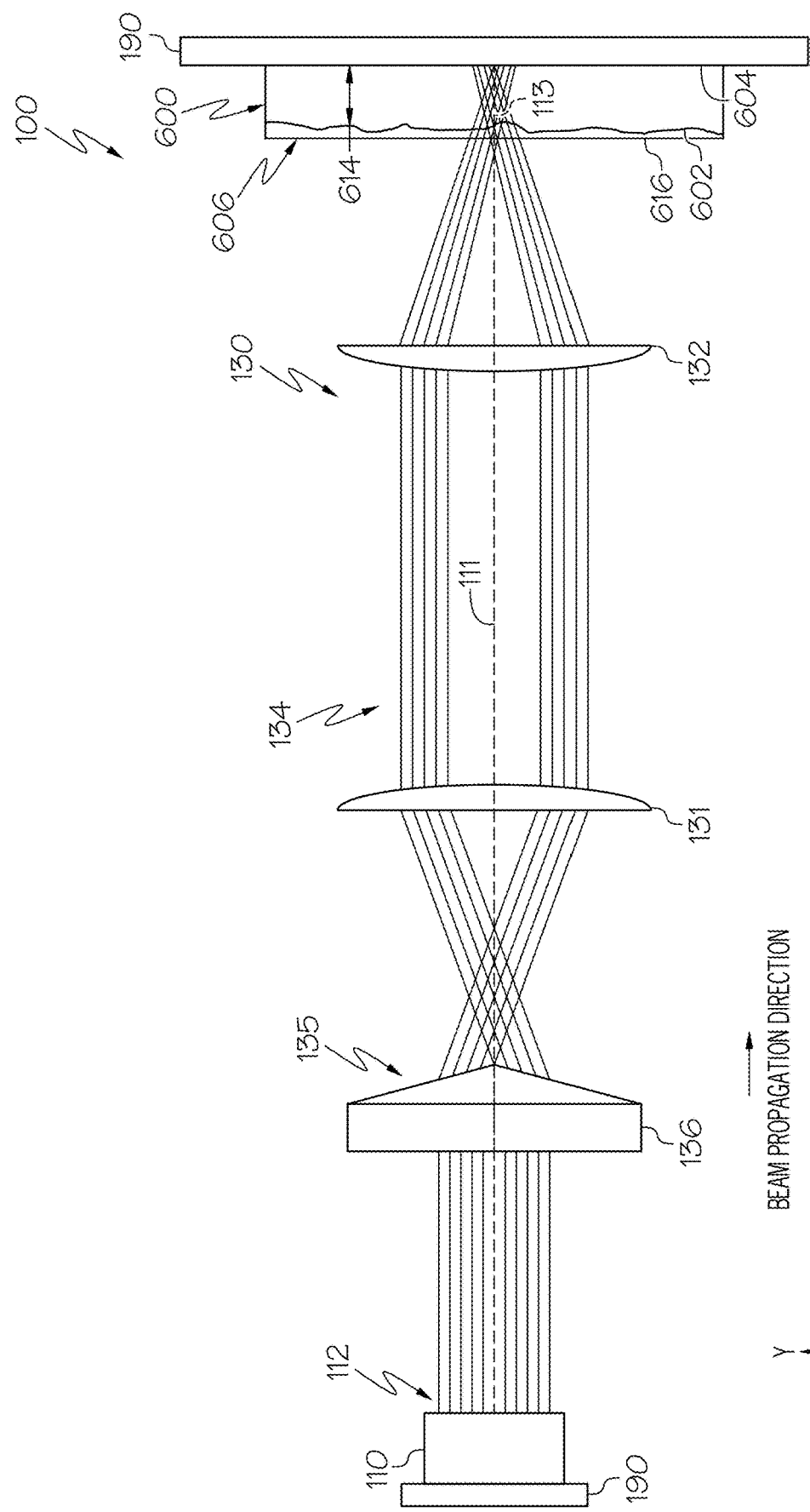
FIG. 6A schematically depicts an optical assembly for laser processing a transparent workpiece with a textured surface having a sacrificial layer disposed thereon, according to one or more embodiments described herein.
Figure 6B:
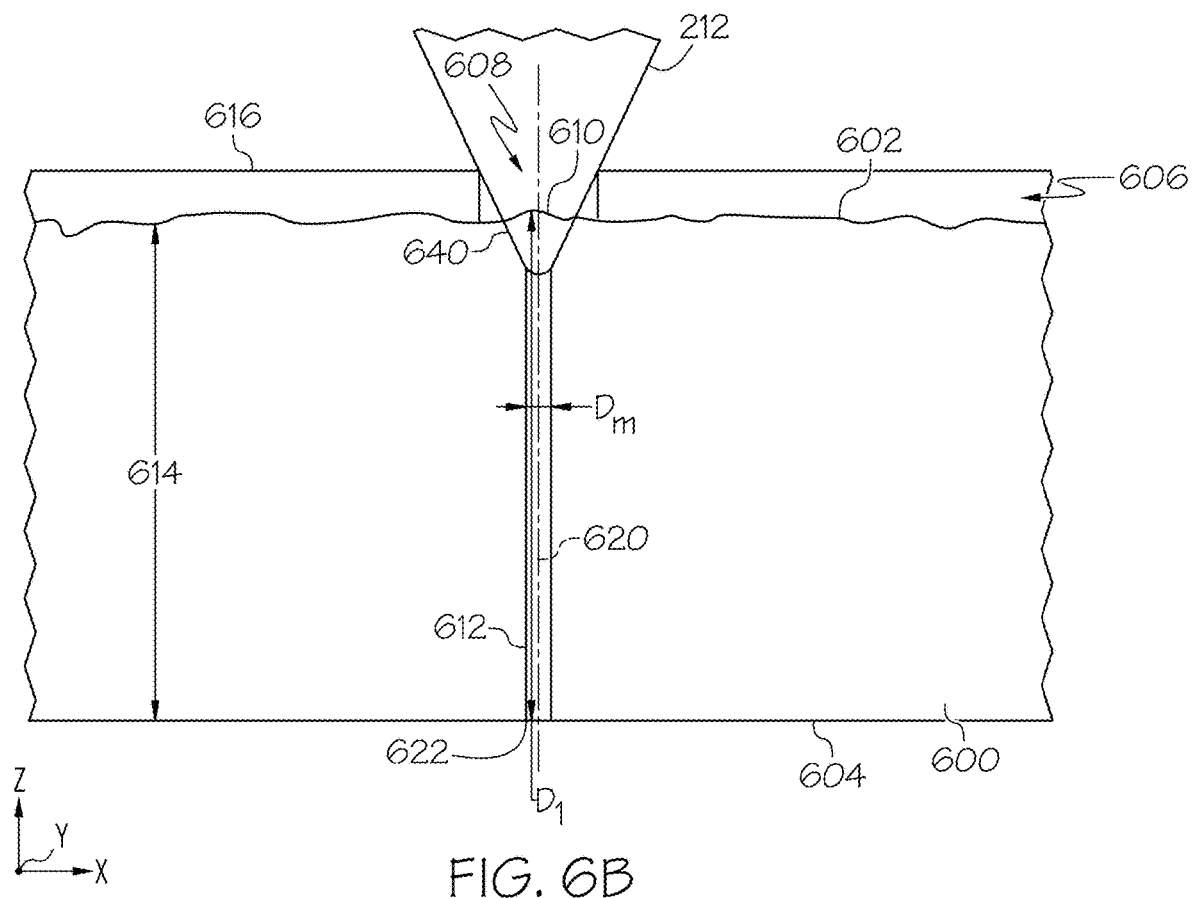
FIG. 6B schematically depicts the infrared laser beam depicted in FIG. 4A incident on a textured surface of a transparent workpiece, according to one or more embodiments described herein.

Referring now to FIGS. 6A and 6B, in view of the issues described herein with respect to FIGS. 4B and 5A-5C, the laser processing method described with respect to FIGS. 1A-4A may be modified. As depicted in FIG. 6A, the optical assembly 100 described herein with respect to FIG. 2 is used to form a plurality of defects in a transparent workpiece 600. The transparent workpiece 600 has a textured surface 602 positioned such that the pulsed laser beam 112 is initially incident on the textured surface 602 prior to passing through a thickness 614 of the transparent workpiece 600.

To counteract distortion of the pulsed laser beam focal line 113, a sacrificial layer 606 is disposed on the textured surface 602. The sacrificial layer 606 is generally transparent to the pulsed laser beam 112. For example, in embodiments, the sacrificial layer 606 comprises a transmission at a wavelength (e.g., a central wavelength) of the pulsed laser beam 112 that is greater than 90% per mm of material depth of the sacrificial layer 606, such as greater than 95% per mm of material depth. In embodiments, the material of the sacrificial layer 606 provides a spatially homogenous phase delay across the surface of the glass sheet (e.g., a phase alteration caused by refractive index). Without intending to be limited by theory, any spatially varying phase alteration will result in a perturbation of the wavefront of the light beam that is intended to focus inside the glass. Such a perturbation to the wavefront will degrade the ability of the laser beam to form a focal spot, focal line, or other tight focus, and hence the laser beam may never reach sufficient intensity to modify the substrate material at all intended locations. Indeed, if the phase perturbation is large enough, then spatially inhomogeneous alteration of the phase or direction of the light causes refraction or scattering, which can reduce transmission. In embodiments, the material of the sacrificial layer 606, when applied to the transparent workpiece 600, may have a transmission of greater than or equal to 70% at the wavelength λ of the pulsed laser beam 112, or, greater than or equal to 90% transmission. Example materials include fluid-based materials (e.g., water, oils, such as castor oil, and the like), polymer-based materials (e.g., polyvinyl acetate, photoresists, such as dry film photoresists), acrylic-based adhesive materials, and other materials meeting the requirements described herein.

In embodiments, the sacrificial layer 606 has a refractive index $n_l$ at the wavelength λ of the pulsed laser beam 112 that is between a refractive index $n_o$ of the transparent workpiece 600 at the wavelength λ and the refractive index of air $n_{air}$ (or a refractive index of any other gas in which the optical assembly 100 is disposed). In embodiments, $n_l$ substantially matches the refractive index $n_o$ of the transparent workpiece 600. For example, in embodiments $-0.05 \leq n_o - n_l \leq 0.25$. In an example, the transparent workpiece 600 has a refractive index $n_o = 1.5$ at the wavelength λ and the sacrificial layer 606 has a refractive index $n_l$ that is greater than or equal to 1.2 and less than or equal to 1.6. In embodiments, $|n_o - n_l| \leq |n_o - n_{air}|$. In embodiments, $1.0 \leq n_l \leq 1.5$. In embodiments, $|n_o - n_l| \leq 0.25$. In embodiments, $n_l$ exceeds $n_o$, but this may result in some Fresnel reflections at the interface between the sacrificial layer 606 and air and reduced transmission over embodiments where $n_l$ is less than or equal to $n_o$.

The refractive index $n_l$ meeting the constraints described in the preceding paragraph beneficially reduces the aberration (e.g., wavefront error) that accumulate in the pulsed laser beam 112 when the pulsed laser beam 112 encounters the textured surface 602 over a case where the transparent workpiece 600 is not covered by the sacrificial layer 606. When the refractive index $n_l$ is closer to the refractive index $n_o$ of the transparent workpiece 600 than $n_{air}$, the angular deviation in the propagation direction resulting from refraction is reduced because the refractive index differential encountered by the pulsed laser beam 112 at the interface between the sacrificial layer 606 and the transparent workpiece 600 is less than an interface between the transparent workpiece 600 and air. Such a reduction in angular deviation of the light rays that comprise the pulsed laser beam 112 reduces the amount of distortion in the formation of the pulsed laser beam focal line 113, which facilitates the pulsed laser beam focal line 113 retaining requisite energy to modify the transparent workpiece 600 throughout an entirety of the thickness 614 of the transparent workpiece 600. That is, the refractive index $n_l$ of the sacrificial layer meeting the constraints described herein facilitates the formation of longer defects that potentially extend throughout the entirety of the thickness 614, which alleviates the issues described herein with respect to FIGS. 5B and 5C (e.g., the cantilever curl 158, the chips 504, and the adhered glass 506).

As depicted in FIG. 6A, the sacrificial layer 606 includes an impingement surface 616 upon which the pulsed laser beam 112 is initially incident (e.g., the pulsed laser beam 112 is incident on the impingement surface 616 prior to contacting the transparent workpiece 600 or any additional layer or structure in mechanical contact with or disposed on the transparent workpiece 600). In embodiments, the impingement surface 616 has a surface roughness (an Sa value) that is less than or equal to a threshold surface roughness (threshold Sa value) to prevent distortion of the pulsed laser beam 112. In embodiments, the threshold surface roughness is a surface roughness of the textured surface 602. In embodiments, the threshold surface roughness is 10 times less the surface roughness of the textured surface 602. In embodiments, the threshold surface roughness is an Sa value that is 10 nm (i.e., the impingement surface 616 has an Sa value less than or equal to 10 nm).

In embodiments, the sacrificial layer 606 is deposited on the textured surface 602 such that that material out of which the sacrificial layer 606 is formed adheres to the textured surface 602 to eliminate gas (e.g., air) pockets at the interface between the sacrificial layer 606 and the textured surface 602. Such gas pockets may result in refraction and scattering of the pulsed laser beam 112 and prevent the pulsed laser beam focal line 113 from having a desired shape. The sacrificial layer 606 may be deposited on the textured surface 602 by any known application technique (e.g., spin-coating, lamination, and the like). In embodiments, after the sacrificial layer 606 is deposited on the textured surface 602, gas pockets occupy less than 10% of a total surface of the interface between the textured surface 602 and the sacrificial layer 606, or more preferably less than 1% of a total surface of the interface (e.g., less than 0.5% of the total surface of the interface).

FIG. 6B schematically depicts the transparent workpiece 600 undergoing a separation step after the formation of a plurality of defects 612 therein extending along a contour 610. In the example depicted, the defects 612 extend through the entire thickness 614 of the transparent workpiece 600 despite the presence of the textured surface 602. Additionally, the plurality of defects 612 have a cross-section that remains consistent throughout the thickness 614 of the transparent workpiece 600. By reducing scattering and distortion of the pulsed laser beam 112, application of the sacrificial layer 606 to the textured surface 602 facilitates the creation of more uniform defects that extend through the entire thickness 614 of the transparent workpiece 600.

In embodiments, the defects 612 extend along the contour 610 at the textured surface 602. Within the transparent workpiece 600, the defects 612 extend through a defect surface 620. In embodiments, the defect surface 620 extends through centers of each of the plurality of defects 612. The defect surface 620 extends from the contour 610 at the textured surface 602 along a defect direction (e.g., the Z-direction in the depicted example) that corresponds to a propagation direction of the pulsed laser beam focal line 113 during the formation of the plurality of defects. A particular one of the defects 612 has a defect length $D_l$. The defect length $D_l$ is a distance within the defect surface 620 from the contour 610 to an endpoint 622 of that defect 612. In the depicted embodiment, the endpoint 622 is located at the second surface 604. More generally, an endpoint 622 for a particular one of the defects may occur within the thickness 614 when energy density of the pulsed laser beam focal line 113 drops below a threshold needed to sufficiently modify the transparent workpiece 600 to continue the defect 612. In embodiments, as a result of the sacrificial layer 606, the plurality of defects each have a defect length $D_l$ that is greater than or equal to 80% of the thickness 614 of the transparent workpiece 600. In the embodiments described herein, the defects extend generally perpendicular to the major surfaces of the transparent workpiece (e.g., in the Z-direction depicted in FIG. 6B). It should be understood that alternative defect directions, where the defects extend at angles to, for example, the textured surface 602 and the second surface 604, are contemplated and within the scope of the present disclosure. Such angled defects may be achieved by tilting the beam forming optics relative to the substrate plane, and may be, for example, less than or equal to degrees (e.g., greater than or equal to 10 degrees and less than or equal to 20 degrees, greater than or equal to 10 degrees and less than or equal to 15 degrees).

The plurality of defects 612 may include an ablated region (e.g., within 50 μm of the textured surface 602), where a void in the transparent workpiece forms as a result of formation of the defects. In embodiments, the plurality of defects include a modified material diameter $D_m$. As used herein, the term "modified material diameter" include aspects of each of the defects 612 not including cracks that propagate through the transparent workpiece 600 as a result of formation of the plurality of defects 612. For example, the modified material diameter $D_m$ may measure a size of a portion of the transparent workpiece 600 within one of the defects 612 including refractive index modifications, changes in molecular bonding, and voids in the transparent workpiece 600 that are completely encapsulated within the thickness 614. In embodiments, an aspect ratio of one of the plurality of defects 612 may be described as a ratio of the defect length $D_l$ and the modified material diameter $D_m$. In embodiments, the aspect ratio of each of the plurality of defects 612 is greater than or equal to 50:1 (e.g., greater than or equal to 100:1).

In the example depicted in FIG. 6B, the transparent workpiece 600 is undergoing a separation step by application of the infrared laser beam 212 described herein with respect to FIGS. 4A and 4B thereto. The infrared laser beam 212 forms a heat affected zone 640 in the transparent workpiece 600 that induces tensile stress to induce crack propagation at the defects 612. It should be appreciated that different separation steps are contemplated and within the scope of the present disclosure. For example, in embodiments, mechanical stress is applied to the plurality of defects 612 along the contour 610 to separate the transparent workpiece 600. In such embodiments incorporating a mechanical separation step, none of the sacrificial layer 606 may be removed from the transparent workpiece 600 prior to the separation step. In embodiments, the transparent workpiece 600 may undergo a chemical separation step where a the transparent workpiece 600 (e.g., including the sacrificial layer 606) is immersed in a chemical etchant solution that preferentially etches the transparent workpiece 600 at the plurality of defects 612 so as to separate the transparent workpiece 600 along the contour. In embodiments, the chemical separation step may be used when the contour 610 is a closed contour in a central region of the transparent workpiece 600.

As depicted in FIG. 6B, the infrared laser beam 212 is directed through an opening 608 in the sacrificial layer 606. In embodiments, at least a portion of the sacrificial layer 606 is removed from the transparent workpiece 600 prior to separation to expose at least a portion of the plurality of defects 612 along the contour 610. In embodiments, the opening 608 is formed by application of the infrared laser beam 212 to the sacrificial layer 606 in order to ablate the sacrificial layer 606 to create the opening 608. Such a removal step is beneficial in that it uses the same components as separating the transparent workpiece 600, and does not require removal of the substrate from the laser cutting tool, hence no additional measurement of the location of defect contours need be made to precisely align the infrared laser beam to the defect contours. The parameters used in the removal step may vary depending on the material of the sacrificial layer 606 and the thickness of the sacrificial layer 606. In an example, the thickness 614 of the transparent workpiece 600 is 1 mm and the sacrificial layer 606 is a polyethylene and polymer coating (e.g., UV-cured photoresist) having a thickness of 15 µm. In this example, the opening 608 was formed using multiple (e.g., four) passes of the infrared laser beam 212 using a power of 200 W, a 6 mm spot diameter, and a scanning speed of 200 mm/sec. In embodiments, the infrared laser beam parameters that are used to form the opening 608 may also be used in the step of separating the transparent workpiece 600.

In embodiments, the parameters of the infrared laser beam (e.g., spot size at the textured surface 602, scanning speed, power) may be adjusted between forming the opening 608 and separating the transparent workpiece 600. For example, referring to FIG. 4A, the positioning of the lens 232 may be adjusted to change a spot size of the infrared laser beam 212 between the step of removing a portion of the sacrificial layer 606 and separating the transparent workpiece 606. Such a step may be beneficial in that the sacrificial layer 606 may be ablated to form the opening 608 using a single pass of the infrared laser beam 212 rather than using multiple passes, thereby reducing processing time. In another example, a reduced scanning speed of the infrared laser beam 212 may be used to ablate the sacrificial layer 606 using fewer passes.

In embodiments, alternative means are used to remove at least a portion of the sacrificial layer 606 prior to separating the transparent workpiece 600. For example, in embodiments, a chemical solution (e.g. a basic solution such as potassium hydroxide, or acetone) or electric discharge plasma may be applied to the sacrificial layer 606 to remove an entirety or portion of the sacrificial layer 606 from the transparent workpiece 600 prior to the transparent workpiece 600 being exposed to the infrared laser beam 212. Such a step may be beneficial in that it may reduce processing times with the infrared laser beam 212, as the infrared laser beam 212 is only used in the separation step. In embodiments, at least a portion of the sacrificial layer 606 is removed via mechanical means (e.g., in a lapping step).

Figure 7:
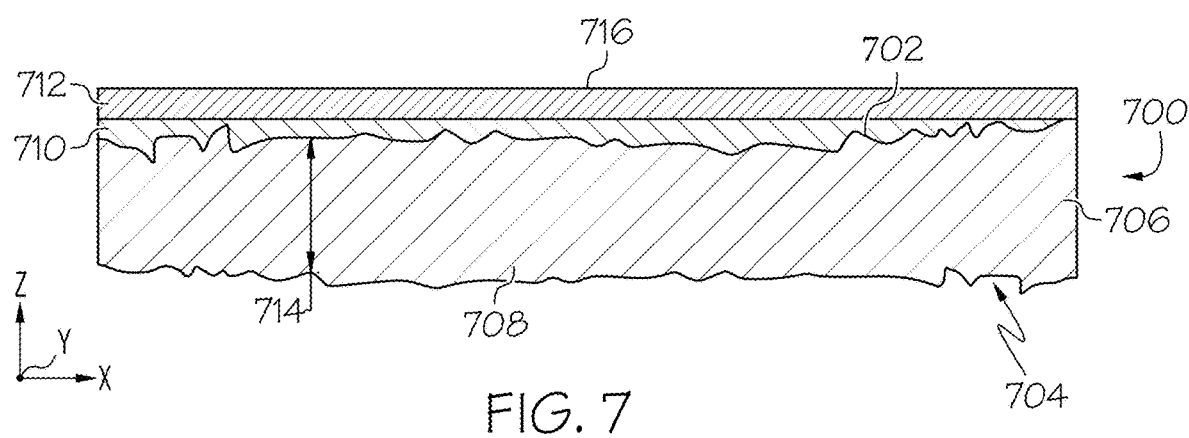
FIG. 7 schematically depicts a transparent workpiece with a textured surface having a sacrificial layer disposed thereon, according to one or more embodiments described herein.

FIG. 7 schematically depicts an example embodiment of a transparent workpiece 700 with a fluid-based sacrificial layer 710 disposed thereon. The transparent workpiece 700 comprises a first textured surface 702 and a second textured surface 704. FIG. 7 depicts the transparent workpiece 700 after formation of a plurality of defects 708 therein (e.g., via application of a defect-forming laser beam generated via the optical assembly 100 described herein). For example, the plurality of defects 708 may be formed by the defect-forming laser beam being initially incident on the first textured surface 702. As described herein, the fluid-based sacrificial layer 710 may have a refractive index $n_l$ that is between $n_{air}$ and a refractive index $n_o$ of the transparent workpiece 700 at the wavelength λ of the defect-forming laser beam to reduce wavefront error caused by the first textured surface 702. The fluid-based sacrificial layer 710 may be formed from any material meeting the transparency, refractive index, and conformity requirements described herein (e.g., oil, water, acrylic-based adhesive, etc.).

In embodiments, application of a fluid-based sacrificial layer 710 onto the first textured surface 702 does not diminish the distortion caused by the first textured surface 702 to a great enough extent to fully realize the benefits of other forms of sacrificial layers (e.g., a polymer-based sacrificial layer such as photoresist). This may be due to the fluid-based sacrificial layer 710 moving while disposed on the first textured surface 702, causing surface ripple and portions of the first textured surface 702 to be uncovered by the fluid-based sacrificial layer 710. Such phenomena may be diminished by providing a cover layer 712 on the fluid-based sacrificial layer 710. The cover layer 712 includes an impingement surface 716 (e.g., a surface upon which the defect-forming laser beam is initial incident) having a surface roughness (e.g., Sa value) that is less than or equal to 10 nm, and a refractive index $n_c$ that is also greater than or equal to $n_{air}$. Like the fluid-based sacrificial layer 710, the cover layer 712 is transparent at the wavelength λ of the defect-forming laser beam.

The cover layer 712 ensures that the defect-forming laser beam is incident on a relatively smooth surface, such as the impingement surface 716. With the cover layer 712, the defect forming laser beam may encounter the greatest refractive index differential at the relatively smooth impingement surface 716. Given this, distortion of the defect-forming laser beam is effectively reduced over embodiments not including the cover layer 712. In embodiments, the cover layer 712 is formed from a glass (e.g., a borosilicate glass) and has a thickness greater than or equal to 100 µm and less than or equal to 200 µm. In embodiments, the cover layer 712 is formed from a different material composition than the fluid-based sacrificial layer 710. In embodiments, the cover layer 712 is formed from the same composition as the fluid-based sacrificial layer, but the cover layer 712 may be in a cured state. In embodiments, the cover layer 712 and the fluid-based sacrificial layer 710 are combined and applied to the textured surface 702 in a single application step (e.g., the fluid-based sacrificial layer 710 may include an adhesive applied to a bottom, surface of the cover layer 712 and the cover layer 712 may be deposited on the textured surface 702). In embodiments, an adhesive tape may be applied to the textured surface 702 to serve combined functions of the fluid-based sacrificial layer 710 and the cover layer 712.

Figure 8:
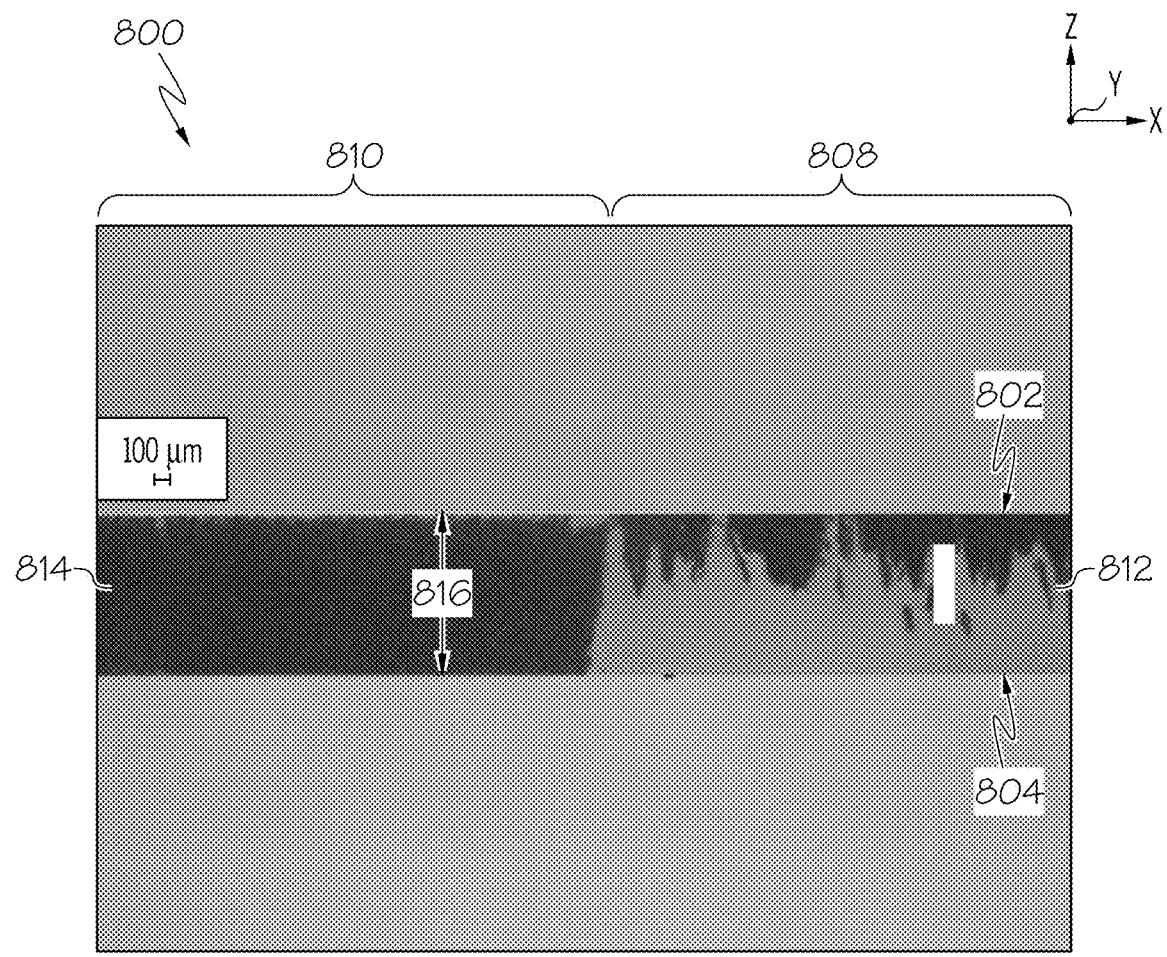
FIG. 8 depicts an isometric view of a transparent workpiece including a first portion covered by a sacrificial layer and a second portion uncovered by a sacrificial layer during the laser processing methods described herein, according to one or more embodiments described herein.

FIG. 8 depicts a transparent workpiece 800 after being subjected to laser processing in accordance the methods described herein. The transparent workpiece 800 includes a textured surface 802, a second surface 804, and a thickness 816 extending between the textured surface 802 and the second surface 804. In the example depicted, the thickness 816 equals 1 mm. During defect formation, a first portion 808 of the textured surface 802 was uncovered (e.g., the defect-forming laser beam was directly incident on the textured surface 702), while a second portion 810 of the textured surface 802 was covered by an oil-based fluid sacrificial layer and a layer of thin glass (e.g., similar in structure to the fluid-based sacrificial layer 710 and cover layer 712 described herein with respect to FIG. 7).

The first portion 808 includes a first plurality of defects 812 and the second portion 810 includes a second plurality of defects 814. As depicted, the first plurality of defects 812 do not extend through an entirety of the thickness 816, while the second plurality of defects 814 are substantially uniform and extend throughout the entirety of the thickness 816. It can be seen that the first plurality of defects 812 extends through on a small fraction of the thickness 816, generally less than 50% of the thickness 816, and that the surface area of the glass edge covered by such defects is <50% for the first plurality of defects 812. In contrast, for the second portion 810 of the transparent workpiece 800 covered by the sacrificial layer, the second plurality of defects 814 extends fully through the thickness of the glass and covers >95% of the surface area of the glass edge. The depicted results demonstrate the efficacy of the combination of the oil-based sacrificial layer and cover layer in reducing beam distortion to facilitate the formation of uniform defects that may extend through an entirety of the thickness of the transparent substrate 800.

Figure 9:
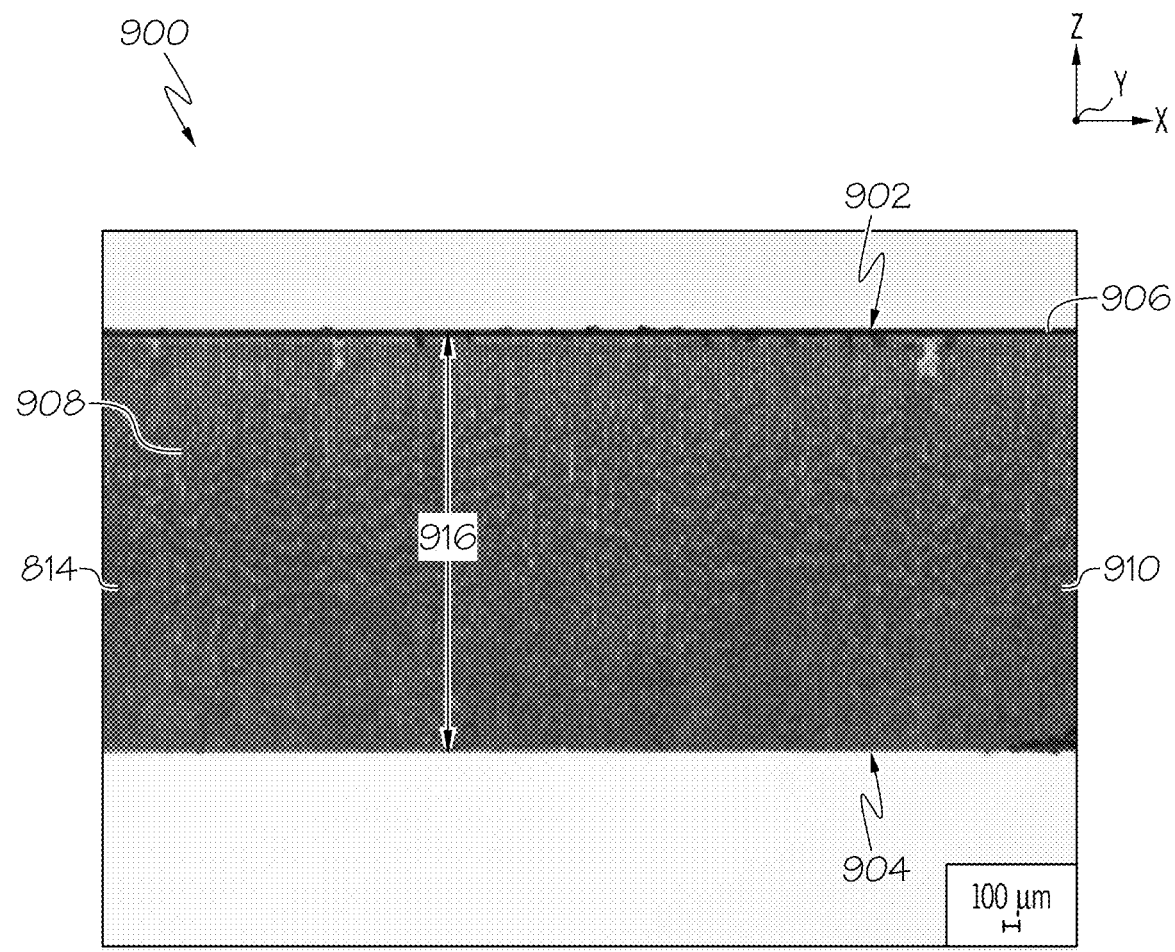
FIG. 9 depicts an isometric view of a transparent workpiece covered by a polymer-based sacrificial layer during the laser processing methods described herein, according to one or more embodiments described herein.

FIG. 9 depicts a transparent workpiece 900 after being subjected to laser processing in accordance the methods described herein. The transparent workpiece 900 includes a textured surface 902, a second surface 904, and a thickness 916 extending between the textured surface 902 and the second surface 904. In the example depicted, the thickness 916 equals 1 mm. The textured surface 902 is covered by a polymer-based sacrificial layer 906. The polymer-based sacrificial layer 906 is constructed from a dry film photoresist (e.g., MX5015 by DuPont® corporation). In embodiments, the polymer-based sacrificial layer 906 is laminated onto the textured surface 902 as a polyethylene and polymer coating and subsequently cured to provide adherence to the textured surface 902. Initial lamination of the polymer-based sacrificial layer 906 to the textured surface 902 beneficially leads to uniform and intimate contact between the polymer-based sacrificial layer 906 and the textured surface 902 and a relatively small number of air pockets (e.g., covering less than 1% of the surface area of the textured surface 902 covered by the polymer-based sacrificial layer 906) at the interface between the transparent workpiece 900 and the polymer-based sacrificial layer 906.

In embodiments, an entirety of the textured surface 902 is exposed to UV radiation such that a cured sacrificial layer 906 covers an entirety of the textured surface 902. In embodiments, only a portion of the textured surface 902 is laminated with the polymer-based sacrificial layer 906 and a corresponding portion of the textured surface 902 is exposed to UV radiation to cure the polymer-based sacrificial layer. In embodiments, the polymer-based sacrificial layer is cured in a pattern that corresponds to a contour of defects to be formed in the transparent workpiece 900 to save material. Alternative application methods (e.g., spin coating) may be used to apply the polymer-based sacrificial layer 906 to the textured surface. In embodiments, after curing, the polymer-based sacrificial layer 906 has a thickness that is equal to 15 µm. In embodiments, the polymer-based sacrificial layer 906 has a thickness that is greater than or equal to 15 µm and less than or equal to 50 µm (e.g., 15 µm, 20 µm, 30 µm, 40 µm, and 50 µm).

Still referring to FIG. 9, the transparent workpiece 900 includes a plurality of defects 908. During formation of the plurality of defects 908, a defect-forming laser beam (e.g., the pulsed laser beam 112 generated via the optical assembly 100 described herein) is initially incident on the polymer-based sacrificial layer 906. In embodiments, the pulsed laser beam focal line 113 forms within the polymer-based sacrificial layer 906. In embodiments, the pulsed laser beam 112 initially enters the polymer-based sacrificial layer 906 in an unfocused state (e.g., not as a pulsed laser beam focal line) and the pulsed laser beam focal line 113 forms at the textured surface 902 or within the transparent workpiece 900. As depicted, the plurality of defects 908 are substantially uniform such that majority (e.g., greater than 90%) of the plurality of defects 908 extend through the entire thickness 916 despite the presence of the textured surface 902.

In embodiments, separation of the transparent workpiece 900 along the plurality of defects 908 results in a cut edge 910. Portions of the plurality of defects 908 may remain in the transparent workpiece 900 at the cut edge 910. In embodiments, separation of the transparent workpiece 900 via any of the separation methods described herein results in coverage of greater than or equal to 80% of the surface area of the cut edge 910 by the plurality of defects 908. That is, the material of the transparent workpiece 900 of the transparent workpiece 900 at the cut edge that is unmodified by the defect forming laser beam accounts for less than or equal to 20% of the surface area of the cut edge 910.

Figure 10:
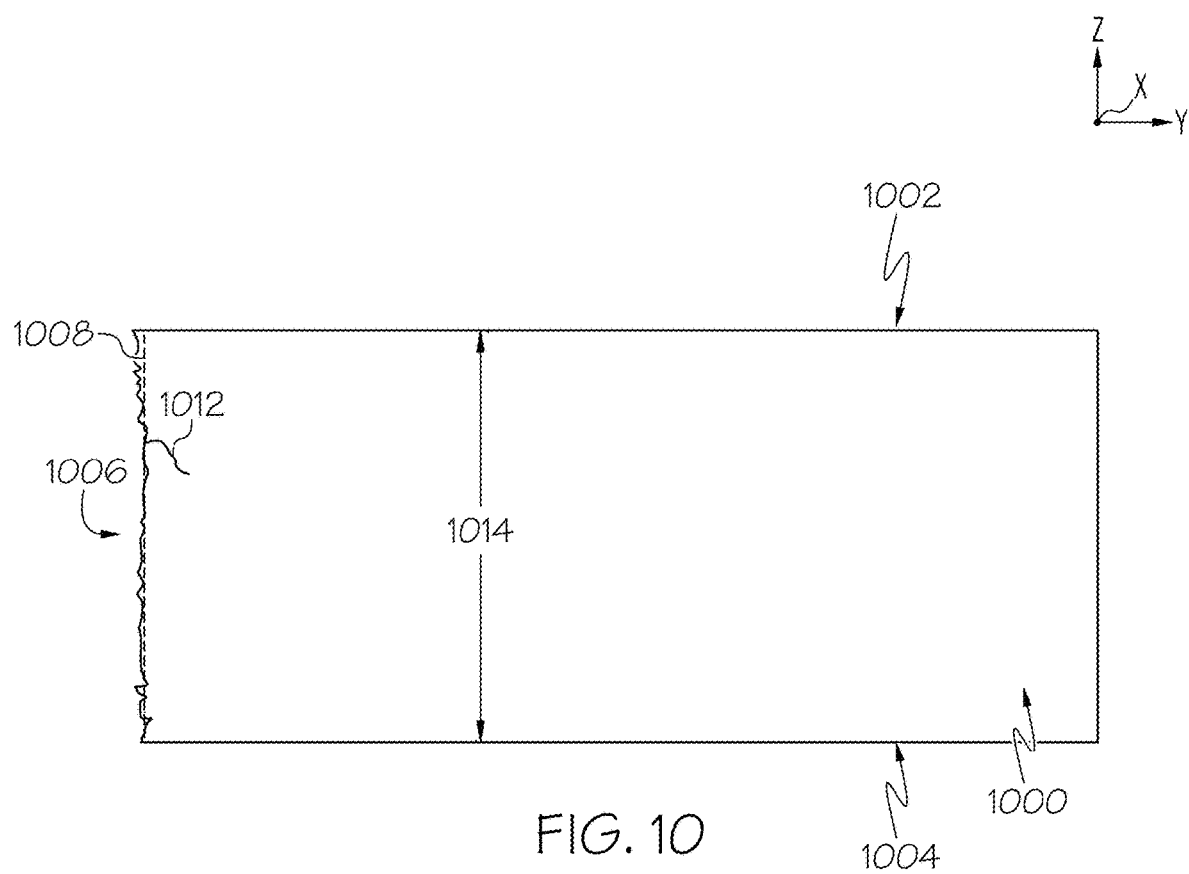
FIG. 10 schematically depicts a separated transparent workpiece in an as-cut condition, according to one or more embodiments described herein.

FIG. 10 schematically depicts an isometric view of a separated transparent workpiece 1000 in an as-cut condition. The separated transparent workpiece 1000 may be a result of the laser processing methods described herein including depositing a sacrificial layer (not depicted) thereon prior to forming a plurality of defects therein. The transparent workpiece 1000 includes a first textured surface 1002, a second textured surface 1004, and a thickness 1014 extending between the first textured surface 1002 and the second textured surface 1004. In embodiments, the transparent workpiece 1000 is a rolled glass sheet and the first and second textured surfaces 1002 and 1004 may have surface roughness values (e.g., Sa values) greater than equal to 0.1 µm and less than or equal to 10.0 µm. In embodiments, the separated transparent workpiece 1000 is constructed of a glass-ceramic material. In embodiments, the transparent workpiece 1000 only includes a single textured surface. In embodiments, the thickness 1014 is greater than or equal to 500 µm (e.g., greater than or equal to 750 µm, greater than or equal to 1 mm, greater than or equal to 1.25 mm, greater than or equal 1.5 mm). In embodiments, the thickness 1014 is greater than or equal to 500 µm and less than or equal to 5 mm (e.g. greater than or equal to 1 mm and less than or equal to 3 mm).

In embodiments, during the laser processing of the separated transparent workpiece 1000, the transparent workpiece 1000 is separated from another portion of a derivative transparent workpiece (not depicted) at a cut edge 1006. The cut edge 1006 may correspond to a crack formed in the derivative transparent workpiece as a result to a stress applied along a plurality of defects formed in the derivative transparent workpiece. For example, in embodiments, the derivative transparent workpiece is subjected to a separation step via the infrared laser beam 212 described herein with respect to FIGS. 4A-4B along a contour of defects. The contour of defects may be formed in accordance with the methods described herein with a defect forming pulsed laser beam forming a pulsed laser beam focal line that extends through the thickness 1014 of the transparent workpiece. In embodiments, the pulsed laser beam is initially incident on one of the first textured surface 1002 and the second textured surface 1004 after initial impingement of any of the sacrificial layers described herein.

In embodiments, after separation at the cut edge 1006, at least a portion of some of the plurality of defects formed in the derivative transparent workpiece are present in the separated transparent workpiece 1000 in the as-cut condition. In the example depicted, the cut edge 1006 has not undergone post-processing by grinding and/or polishing. That is, the transparent workpiece 1000 is in a state just after separation from the derivative workpiece, without undergoing any additional processing steps.

As depicted in FIG. 10, separation of the derivative transparent workpiece results in sub-surface damage 1012 at the cut edge 1006. The sub-surface damage 1012 may include perforations, cracks, holes, pores, and the like that extend generally perpendicular to the cut edge 1006 (e.g., in the Y-direction). As a result of application of the sacrificial layer during the formation of the plurality of defects, the textured glass material may be cut with the laser process, and resulting sub-surface damage 1012 may extend less than or equal to 30 µm (e.g., less than or equal to 15 µm in certain embodiments) into the separated transparent workpiece 1000 from the cut edge 1006. This is a significant improvement over existing separating techniques (e.g., mechanical score and break techniques) that are currently used to separate transparent workpieces with textured surfaces. Such existing techniques may result in sub-surface damage of greater than or equal to 100 µm, resulting in significant material waste. As such, the methods described herein facilitate precise separation of the transparent workpiece with relatively low sub-surface damage 1012, requiring less amounts of grinding and polishing to achieve a desired surface strength at the cut edge 1006. In embodiments, the cut edge 1006 (e.g., prior to any finishing, etching, or ion-exchange strengthening) comprises a bend strength measured via the 4-pt bend method of greater than or equal to 150 MPa (B10). That is, less than 10% of transparent workpieces 1000 subjected to stresses less than 150 MPa at the cut edge 1006 fail. In embodiments where the transparent workpiece 1000 is formed of a glass ceramic, the cut edge 1006 comprises a bend strength measured via the 4-pt bend method of greater than or equal to 250 MPa (B10).

In embodiments, the plurality of defects formed in the derivative transparent workpiece out of which the separated transparent workpiece 1000 is formed extend in a defect surface 1008. Centers of the defects may overlap the defect surface 1008 such that the defect surface 1008 only extends through central regions of the defects. In the depicted example, the defect surface 1008 comprises a planar sheet extending between the first and second textured surfaces 1002 and 1004 in a direction perpendicular to the first and second textured surfaces 1002 and 1004 (e.g. in an X-Z plane). It should be appreciated that the direction in which the defect surface 1008 extends may vary in alternative embodiments and extend at different angles relative to the first and second textured surfaces 1002 and 1004. In embodiments, the cut edge 1006 deviates from the defect surface 1008 by no more than 10 µm in a direction perpendicular to the defect surface 1008 (e.g., in the Y-direction).

In embodiments, the surface height (e.g., as measured from a centerline in a direction, such as the Y-direction, extending perpendicular to the cut edge 1006) of the cut edge 1006 varies between a maximum value $H_{max}$ and a minimum value $H_{min}$ (with sub-surface damage 1012 being filtered out of such surface height measurements). In embodiments, a difference between the maximum value $H_{max}$ and the minimum value $H_{min}$ is less than or equal to 10 µm. As described herein with respect to FIG. 5B, laser processing transparent workpieces with textured surfaces without depositing a sacrificial layer described herein may result in cantilever curls having a size on the order of greater than or equal to 100 µm. As such, application of the sacrificial layers described herein effectively significantly diminishes the amount of grinding and polishing needed to obtain a well finished and high fidelity edge.

In embodiments, the cut edge 1006 follows a curved contour at the textured surface 1002 (e.g., the plurality of defects extend through a curved defect plane). The relatively low sub-surface damage 1012 and long extension of the defects into the thickness 1014 of the transparent workpiece described herein facilitate cutting along such curved contours while avoid chipping and adhered glass described herein with respect to FIG. 5C. If the laser formed defects do not extend through the full body of the substrate, then at such radiused corners the separated edge may deviate from the intended contour, making chipping and adhered glass structures more common. Provision of a sacrificial layer described herein during formation of the plurality of defects facilitates formation of cut edges extending along curved contours having a radius of curvature of less than or equal to 10 mm (e.g., even less than or equal to 2.5 mm in certain embodiments) while maintaining adherence of less than or equal to 10 µm to the defect plane throughout the cut edge 1006.

Figure 11:
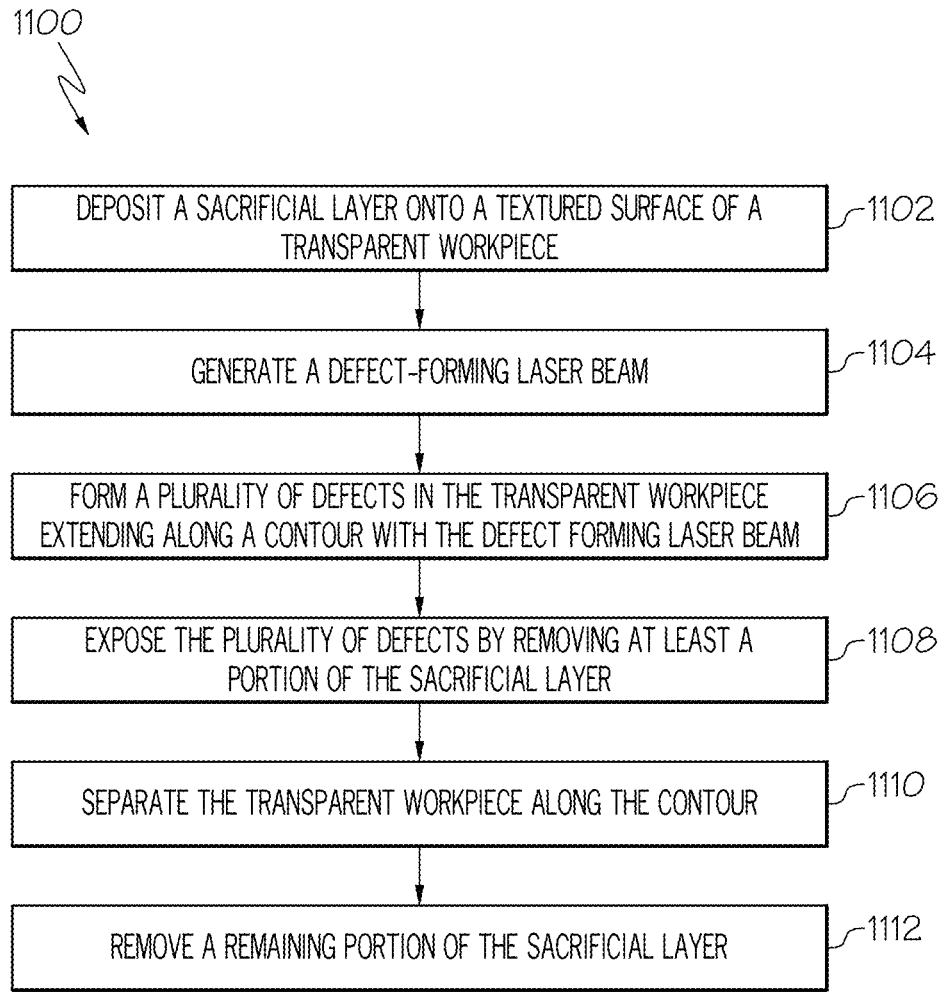
FIG. 11 depicts a flow diagram of a method of separating a transparent workpiece with a textured surface, according to one or more embodiments described herein.

Referring now to FIG. 11, a flow diagram of a method 1100 of separating a transparent workpiece along a contour of defects is depicted. The method 1100 may be performed to separate a transparent workpiece, such as a transparent workpiece having a textured surface. Transparent workpieces having various compositions (e.g., rolled glass sheets, glass-ceramic substrates) may be separated via performance of the method 1100. The transparent workpiece is generally transparent at the wavelength λ of the defect-forming laser beam used in performing the method 1100 and has a thickness that is greater than or equal to 500 µm.

In a step 1102, a sacrificial layer is deposited onto a textured surface of a transparent workpiece. As described herein, a plurality of different sacrificial layers may be used depending on the implementation. For example, embodiments may use a fluid-based sacrificial layer (e.g., water, oil, or any fluid meeting the transmission and refractive index requirements described herein), a fluid-based sacrificial layer in combination with a cover layer, a polymer-based sacrificial layer, an adhesive-based sacrificial layer, or a sacrificial layer constructed of any other material capable of conforming with the textured surface of the transparent workpiece to avoid air-filled voids at the interface between the sacrificial layer and the transparent workpiece. The manner in which the sacrificial layer is deposited onto the textured surface will vary depending on the type of sacrificial layer used. For example, application of solid sacrificial layers to the transparent workpiece may involve aligning the sacrificial layer with the transparent workpiece and pressing the sacrificial layer to the textured surface using any known technique (e.g., lamination). Fluid and polymer-based sacrificial layers may be applied using any known coating technique.

In a step 1104, a defect-forming laser beam is generated. In embodiments, the optical assembly 100 may be used in the performance of the method 1100 and the pulsed beam source 110 described herein may be used to generate the defect-forming laser beam (e.g., as the pulsed laser beam 112). In a step 1106, a plurality of defects are formed in the transparent workpiece that extend along a contour. In embodiments, the optical assembly 100 includes an aspheric optical element 135 that converts the pulsed laser beam 112 from the pulsed beam source 110 into a pulsed laser beam focal line 113 with a lens assembly 130. The transparent workpiece may be positioned with respect to the lens assembly 130 such that the pulsed laser beam focal line 113 overlaps the transparent workpiece. As such, the pulsed laser beam 112 is directly incident on the sacrificial layer, extends through the sacrificial layer, through the textured surface, and into a thickness of the transparent workpiece as a pulsed laser beam focal line. At least one of the transparent workpiece and the pulsed laser beam 112 are moved relative to each other along a contour line such that the pulsed laser beam 112 forms a plurality of defects in the transparent workpiece that extend along a contour.

In a step 1108, the plurality of defects are exposed by removing at least a portion of the sacrificial layer. In embodiments, a recess is formed in the sacrificial layer that overlaps the plurality of defects. In embodiments, the infrared laser beam 212 used to separate the transparent workpiece along the plurality of defects is used to remove the portion of the sacrificial layer. In embodiments, at least one of the infrared laser beam 212 and the transparent workpiece are moved relative to one another such that the infrared laser beam travels over the contour of defects along the sacrificial layer to ablate the portion of the sacrificial layer overlapping the plurality of defects. In embodiments, all or a portion of the sacrificial layer may be removed chemically from the transparent workpiece. In embodiments, all or a portion of the sacrificial layer may be removed mechanically from the transparent workpiece (e.g., via a lapping process).

In a step 1110, the transparent workpiece is separated along the contour of defects. In embodiments, the infrared laser beam 212 is traversed along the plurality of defects to induce crack propagation through the thickness of the transparent workpiece within a defect plane along the plurality of defects to induce separation of the transparent workpiece along (or within 10 µm of) a desired line of separation (or defect plane) corresponding to the contour of defects. In embodiments, mechanical stress may be applied along the contour of defects to effect separation. Such embodiments may omit the step 1108 as the mechanical stress may separate the sacrificial layer. In embodiments, a chemical etchant is applied to the transparent workpiece that preferentially etches the plurality of defects to separate a portion of the transparent workpiece at the plurality of defects. In such embodiments, the method 1100 may omit the step 1108, as the chemical etchant may remove the sacrificial layer. In such embodiments, the contour may be closed such that a surrounded portion of the transparent workpiece is separated from a remainder of the transparent workpiece.

In a step 1112, a remaining portion of the sacrificial layer is removed. For example, the sacrificial layer may be removed chemically or mechanically to expose the texture surface and provide a separated transparent workpiece such as the separated transparent workpiece 1000 described herein with respect to FIG. 10. In embodiments, the method 1100 omits the step 1112 and the sacrificial layer remains on the separated transparent workpiece. For example, the sacrificial layer may serve a protective function or as an alternative coating.

In view of the foregoing description, it should be understood that depositing a sacrificial layer on a textured surface of a transparent workpiece prior to laser processing the transparent workpiece facilitates separating the transparent workpiece in a manner that conforms to a desired line of separation and provides relatively low sub-surface damage as compared to existing separation techniques used to separate transparent workpieces with textured surfaces. Using the methods described herein, transparent workpieces including textured surfaces may be separated along a contour of defects having any desired shape (e.g., a curved contour possessing a radius of curvature of less than or equal to 10 mm or less than or equal to 2.5 mm), while requiring relatively low amounts of grinding and polishing of the cut edge (e.g., less than or equal to 30 µm, less than or equal to 15 µm) to provide high equality edges along such contours, which represents a significant improvement over existing mechanical scoring and breaking techniques. The methods described herein thus have the potential to significantly increase material utilization percentages, and reduce edge finishing processing time and cost, over existing separation techniques.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of separating a transparent workpiece, the method comprising:
    depositing a sacrificial layer onto a textured surface of the transparent workpiece, the transparent workpiece having a thickness between the textured surface and a second surface of the transparent workpiece, the sacrificial layer comprising a refractive index that is less than or equal to a refractive index of the transparent workpiece and greater than or equal to a refractive index of air, the textured surface having an Sa value of greater than or equal to 0.1 µm;
    generating a defect-forming laser beam via an optical assembly;
    forming a plurality of defects comprising an ablated region in the transparent workpiece by directing the defect-forming laser beam directly onto an impingement surface of the sacrificial layer from the optical assembly such that the laser beam propagates through the transparent workpiece via the sacrificial layer and translating the transparent workpiece and the laser beam relative to each other along a contour, wherein the defect forming laser beam comprises:
        a pulsed laser beam forming a laser beam focal line at the textured surface or within the transparent workpiece, and
        an optical power of greater than or equal to a critical power level to induce Kerr effect self-focusing throughout the entirety of the thickness; and
    separating the transparent workpiece along the contour.

2. The method of claim 1, wherein the defect-forming laser beam comprises the pulsed laser beam forming the laser beam focal line in the transparent workpiece, the laser beam focal line inducing absorption in the transparent workpiece, the induced absorption producing an individual defect of the plurality of defects in the transparent workpiece.

3. The method of claim 2, wherein the laser beam focal line formed from the pulsed laser beam comprises:
    a wavelength $\lambda$;
    a spot size $w_o$; and
    a Rayleigh range $Z_R$ that $$F_D \frac{\pi w_o^2}{\lambda},$$

is greater than where $F_D$ is a dimensionless divergence factor comprising a value of 10 or greater.

4. The method of claim 3, wherein the optical assembly includes a phase-altering optical element that generates a quasi-non-diffracting beam from the pulsed laser beam.

5. The method of claim 2, wherein the pulsed laser beam comprises pulse bursts comprising two or more sub-pulses per pulse burst, wherein each pulse burst comprises an energy of greater than or equal to 25 µJ and less than or equal to 5000 µJ.

6. The method of claim 1, wherein each of the plurality of defects comprise modified material of the transparent workpiece that is completely encapsulated within the transparent workpiece.

7. The method of claim 1, wherein the plurality of defects comprise a defect length $D_l$, a maximal defect diameter $D_{dmax}$, and a defect aspect ratio comprising a ratio of $D_l$ to $D_{dmax}$, wherein the aspect ratio is greater than or equal to 15:1.

8. The method of claim 1, wherein:
the plurality of defects extend through a defect surface, the defect surface extending between the contour on the textured surface and end points of the plurality of defects at the second surface, and
at the defect surface, the plurality of defects extend from the textured surface by a distance that greater than or equal to 80% of the thickness of the transparent workpiece along the defect surface.

9. The method of claim 1, wherein the textured surface has an Sa value of greater than or equal to 0.3 µm.

10. The method of claim 1, wherein the thickness is greater than or equal to 500 µm in a direction perpendicular to the textured surface and the second surface.

11. The method of claim 10, wherein the thickness is greater than or equal to 1 mm and less than or equal to 5 mm in a direction perpendicular to the textured surface and the second surface.

12. The method of claim 1, wherein the separating the transparent workpiece along the contour results in a glass article having a cut edge conforming to the contour in an as-cut condition, wherein, over any given 100 µm length of the separated contour, a surface of the cut edge deviates from a fitted surface to the cut edge by less than or equal to 10 µm.

13. The method of claim 1, wherein the sacrificial layer comprises a polymer-based material, wherein the depositing the sacrificial layer onto the textured surface comprises:
laminating the polymer-based material onto the textured surface; and
curing the polymer-based material by exposing the laminated polymer-based material to a radiation source.

14. The method of claim 13, wherein the sacrificial layer has a thickness of greater than or equal to 10 µm and less than or equal to 20 µm.

15. A method of separating a transparent workpiece, the method comprising:
depositing a polymer-based sacrificial layer directly onto a textured surface of the transparent workpiece, the polymer-based sacrificial layer comprising a refractive index between that of the transparent workpiece and air;
generating a defect-forming laser beam via an optical assembly, wherein the defect forming laser beam comprises:
a pulsed laser beam forming a laser beam focal line at the textured surface or within the transparent workpiece, and
an optical power of greater than or equal to a critical power level to induce Kerr effect self-focusing throughout the entirety of the thickness;
forming a plurality of defects comprising an ablated region in the transparent workpiece by directing the defect-forming laser beam directly onto an impingement surface of the polymer-based sacrificial layer from the optical assembly such that the laser beam propagates through the transparent substrate via the polymer-based sacrificial layer and translating the transparent workpiece and the laser beam relative to each other along a contour line, wherein the plurality of defects extend along a contour and extend from the textured surface into the transparent workpiece by a distance that greater than or equal to 80% of the thickness of the transparent workpiece;
removing at least a portion of the polymer-based sacrificial layer from the transparent workpiece to expose at least a portion of the plurality of defects at the textured surface; and
separating the transparent workpiece along the contour.

16. The method of claim 15, wherein the sacrificial layer has a thickness of greater than or equal to 10 µm and less than or equal to 20 µm.

17. The method of claim 15, wherein the transparent workpiece comprises at least one of a rolled glass sheet and a glass-ceramic material.

* * * * *